(12) United States Patent
Igarashi et al.

(10) Patent No.: US 11,025,791 B2
(45) Date of Patent: Jun. 1, 2021

(54) INFORMATION PROCESSING APPARATUS, PRINTING APPARATUS, INFORMATION PROCESSING METHOD, AND PROGRAM, PROVIDING ACCURATE IDENTIFICATION OF THE TYPE OF A PRINTING MEDIUM BY INCREASING THE OPPORTUNITY TO IMPROVE THE ACCURACY OF DETERMINING THE TYPE OF PRINTING MEDIUM BASED ON MEASUREMENT RESULTS

(71) Applicant: CANON KABUSHIKI KAISHA, Tokyo (JP)

(72) Inventors: Yuki Igarashi, Tokyo (JP); Takehiko Kasamatsu, Fujisawa (JP); Fumikazu Nishikawa, Zushi (JP); Yasushi Morimoto, Kawasaki (JP); Koji Suda, Kawasaki (JP); Keiko Harada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/828,526

(22) Filed: Mar. 24, 2020

(65) Prior Publication Data
US 2020/0314276 A1    Oct. 1, 2020

(30) Foreign Application Priority Data
Mar. 28, 2019 (JP) .............................. JP2019-063891

(51) Int. Cl.
*G06F 3/12*      (2006.01)
*H04N 1/00*      (2006.01)

(52) U.S. Cl.
CPC ..... *H04N 1/00779* (2013.01); *H04N 1/00427* (2013.01); *H04N 1/00482* (2013.01); *H04N 1/00724* (2013.01)

(58) Field of Classification Search
None
See application file for complete search history.

(56) References Cited

U.S. PATENT DOCUMENTS

| 5,459,580 A | 10/1995 | Suzuki |
| 8,964,251 B2 * | 2/2015 | Matsuzaki ............. G03G 15/01 358/1.9 |

(Continued)

FOREIGN PATENT DOCUMENTS

| EP | 2487893 A1 | 8/2012 |
| JP | 2005070877 A | * 3/2005 |
| JP | 2016-215591 A | 12/2016 |

*Primary Examiner* — Henok Shiferaw
(74) *Attorney, Agent, or Firm* — Canon U.S.A., Inc. IP Division

(57) ABSTRACT

An information processing apparatus is configured to control an operation to determine a type of a printing medium to be printed by a printing unit, determine a type of printing medium indicated by information input by an input unit as the type of the printing medium to be printed, and be capable of executing a measurement mode and a designation mode. In the measurement mode, the type of the printing medium to be printed is determined by using a measurement result and a reference characteristic values set in advance. In the designation mode, the type of the printing medium to be printed is determined without using the measurement result. The information processing apparatus is configured to, even in the designation mode, change the reference characteristic value set in advance for the type of printing medium indicated by the information input by the input unit based on the measurement result.

26 Claims, 26 Drawing Sheets

(56) References Cited

U.S. PATENT DOCUMENTS

| | | | |
|---|---|---|---|
| 10,274,884 B2* | 4/2019 | Okanishi | G03G 15/5029 |
| 10,331,985 B2* | 6/2019 | Feng | G06K 15/021 |
| 2005/0030334 A1 | 2/2005 | Kai et al. | |
| 2009/0296118 A1* | 12/2009 | Tsukamoto | H04N 1/6033 |
| | | | 358/1.9 |
| 2016/0044195 A1* | 2/2016 | Murrell | H04N 1/00708 |
| | | | 358/1.1 |

* cited by examiner

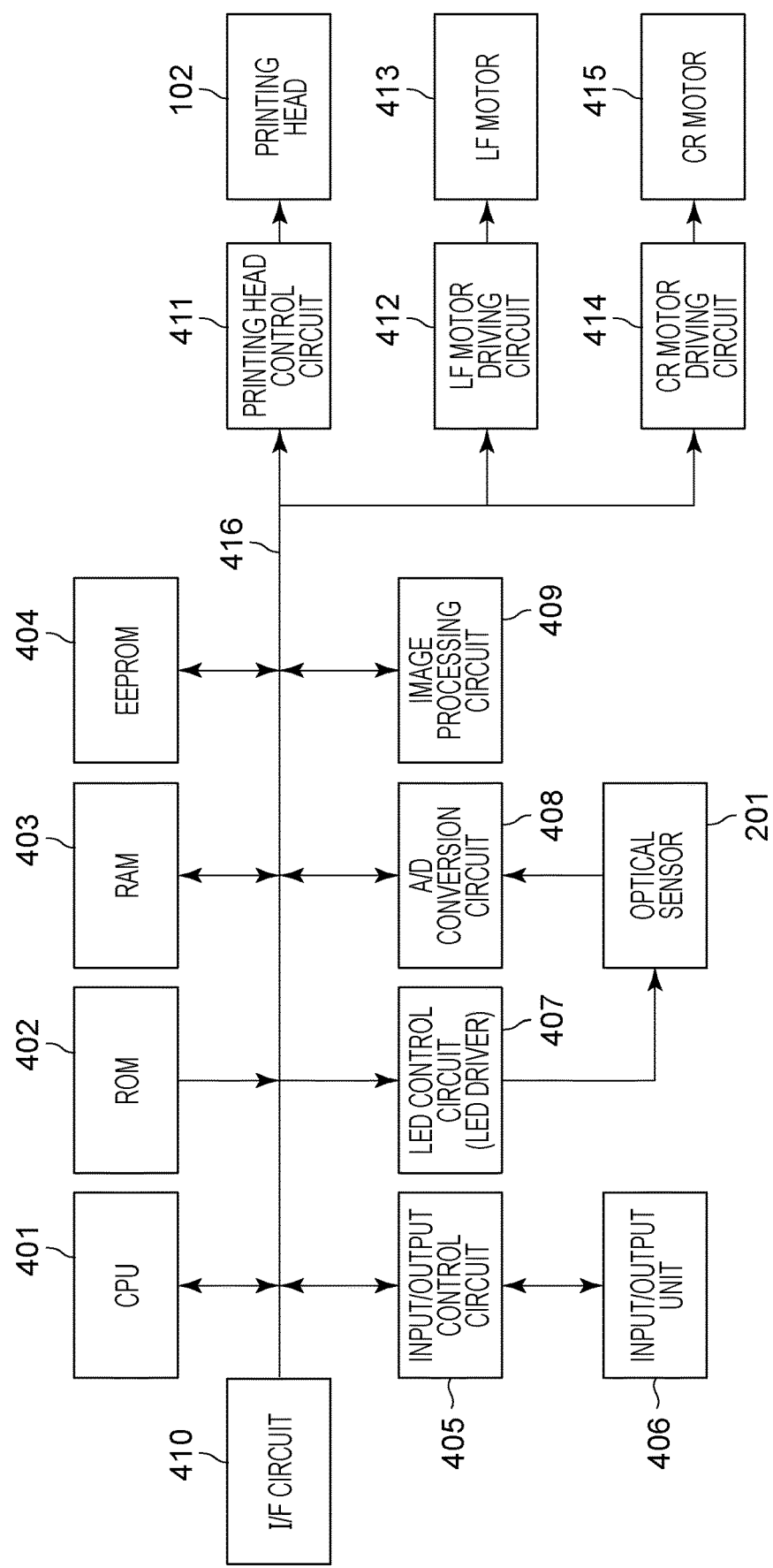

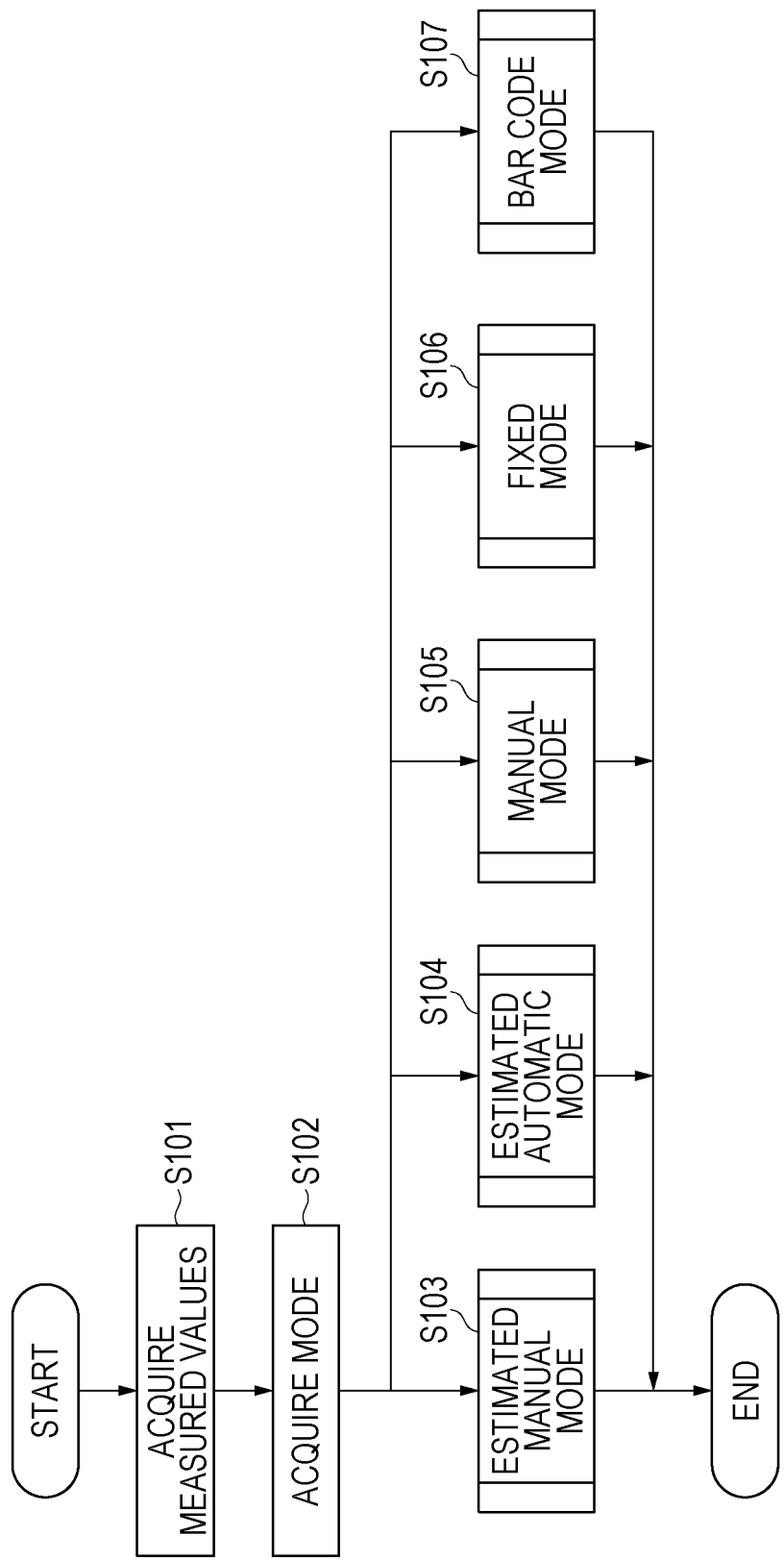

FIG. 9A

|  |  | STANDARD GLOSSY PAPER | STANDARD HALF-GLOSSY PAPER | PREMIUM GLOSSY PAPER | THICK GLOSSY PAPER | STANDARD PLAIN PAPER | PREMIUM PLAIN PAPER |
|---|---|---|---|---|---|---|---|
| SPECULAR REFLECTION VALUE | MIN | 95 | 94 | 100 | 95 | 85 | 90 |
|  | MIDDLE | 100 | 99 | 105 | 100 | 90 | 95 |
|  | MAX | 105 | 104 | 110 | 105 | 95 | 100 |
| DIFFUSED REFLECTION VALUE | MIN | 95 | 90 | 110 | 95 | 70 | 78 |
|  | MIDDLE | 100 | 95 | 115 | 100 | 75 | 83 |
|  | MAX | 105 | 100 | 120 | 105 | 80 | 88 |
| PAPER THICKNESS | MIN | 140 | 140 | 160 | 220 | 45 | 60 |
|  | MIDDLE | 190 | 190 | 210 | 270 | 95 | 110 |
|  | MAX | 240 | 240 | 260 | 320 | 145 | 160 |

FIG. 9B

|  |  | STANDARD GLOSSY PAPER | STANDARD HALF-GLOSSY PAPER | PREMIUM GLOSSY PAPER | THICK GLOSSY PAPER | STANDARD PLAIN PAPER | PREMIUM PLAIN PAPER |
|---|---|---|---|---|---|---|---|
| SPECULAR REFLECTION VALUE | MIN | 95 | 95 | 100 | 95 | 85 | 90 |
|  | MIDDLE | 100 | 100 | 105 | 100 | 90 | 95 |
|  | MAX | 105 | 105 | 110 | 105 | 95 | 100 |
| DIFFUSED REFLECTION VALUE | MIN | 95 | 91 | 110 | 95 | 70 | 78 |
|  | MIDDLE | 100 | 96 | 115 | 100 | 75 | 83 |
|  | MAX | 105 | 101 | 120 | 105 | 80 | 88 |
| PAPER THICKNESS | MIN | 140 | 149 | 160 | 220 | 45 | 60 |
|  | MIDDLE | 190 | 199 | 210 | 270 | 95 | 110 |
|  | MAX | 240 | 249 | 260 | 320 | 145 | 160 |

FIG. 12

| | |
|---|---|
| SPECULAR REFLECTION VALUE | 103 |
| DIFFUSED REFLECTION VALUE | 98 |
| PAPER THICKNESS | 225 |

FIG. 13

| PAPER THICKNESS | STANDARD GLOSSY PAPER | STANDARD HALF-GLOSSY PAPER | PREMIUM GLOSSY PAPER | THICK GLOSSY PAPER | STANDARD PLAIN PAPER | PREMIUM PLAIN PAPER |
|---|---|---|---|---|---|---|
| DIFFUSED REFLECTION VALUE | APPLICABLE | APPLICABLE | APPLICABLE | APPLICABLE | NOT APPLICABLE | NOT APPLICABLE |
| SPECULAR REFLECTION VALUE | APPLICABLE | APPLICABLE | NOT APPLICABLE | APPLICABLE | NOT DETERMINED | NOT DETERMINED |
|  | APPLICABLE | APPLICABLE | NOT DETERMINED | APPLICABLE | NOT DETERMINED | NOT DETERMINED |

FIG. 14A

| | STANDARD GLOSSY PAPER | STANDARD HALF-GLOSSY PAPER | PREMIUM GLOSSY PAPER | THICK GLOSSY PAPER | STANDARD PLAIN PAPER | PREMIUM PLAIN PAPER |
|---|---|---|---|---|---|---|
| SPECULAR REFLECTION VALUE | 0.6 | 0.8 | NOT APPLICABLE | 0.6 | NOT APPLICABLE | NOT APPLICABLE |
| DIFFUSED REFLECTION VALUE | 0.4 | 0.6 | NOT APPLICABLE | 0.4 | NOT APPLICABLE | NOT APPLICABLE |
| PAPER THICKNESS | 0.7 | 0.7 | NOT APPLICABLE | 0.9 | NOT APPLICABLE | NOT APPLICABLE |
| TOTAL | 1.7 | 2.1 | | 1.9 | | |
| PRIORITY ORDER | 1 | 3 | | 2 | | |

FIG. 14B

| | STANDARD GLOSSY PAPER | STANDARD HALF-GLOSSY PAPER | PREMIUM GLOSSY PAPER | THICK GLOSSY PAPER | STANDARD PLAIN PAPER | PREMIUM PLAIN PAPER |
|---|---|---|---|---|---|---|
| SPECULAR REFLECTION VALUE | 0.6 | 0.4 | NOT APPLICABLE | 0.6 | NOT APPLICABLE | NOT APPLICABLE |
| DIFFUSED REFLECTION VALUE | 0.4 | 0.6 | NOT APPLICABLE | 0.4 | NOT APPLICABLE | NOT APPLICABLE |
| PAPER THICKNESS | 0.7 | 0.52 | NOT APPLICABLE | 0.9 | NOT APPLICABLE | NOT APPLICABLE |
| TOTAL | 1.7 | 1.52 | | 1.9 | | |
| PRIORITY ORDER | 2 | 1 | | 3 | | |

FIG. 15A

| SPECULAR REFLECTION VALUE | | STANDARD HALF-GLOSSY PAPER |
|---|---|---|
| | LAST MEASURED VALUE | 99 |
| | SECOND LAST MEASURED VALUE | 99 |
| | THIRD LAST MEASURED VALUE | 99 |
| | CHARACTERISTIC VALUE (AVERAGE VALUE) | 99 |

FIG. 15B

| SPECULAR REFLECTION VALUE | | STANDARD HALF-GLOSSY PAPER |
|---|---|---|
| | LAST MEASURED VALUE | 103 |
| | SECOND LAST MEASURED VALUE | 99 |
| | THIRD LAST MEASURED VALUE | 99 |
| | CHARACTERISTIC VALUE (AVERAGE VALUE) | 100.3 |

FIG. 15C

| | | STANDARD HALF-GLOSSY PAPER |
|---|---|---|
| SPECULAR REFLECTION VALUE | LAST MEASURED VALUE | 104 |
| | SECOND LAST MEASURED VALUE | 103 |
| | THIRD LAST MEASURED VALUE | 99 |
| | CHARACTERISTIC VALUE (AVERAGE VALUE) | 102 |

FIG. 15D

| | | STANDARD HALF-GLOSSY PAPER |
|---|---|---|
| SPECULAR REFLECTION VALUE | LAST MEASURED VALUE | 102 |
| | SECOND LAST MEASURED VALUE | 104 |
| | THIRD LAST MEASURED VALUE | 103 |
| | CHARACTERISTIC VALUE (AVERAGE VALUE) | 103 |

INFORMATION PROCESSING APPARATUS, PRINTING APPARATUS, INFORMATION PROCESSING METHOD, AND PROGRAM, PROVIDING ACCURATE IDENTIFICATION OF THE TYPE OF A PRINTING MEDIUM BY INCREASING THE OPPORTUNITY TO IMPROVE THE ACCURACY OF DETERMINING THE TYPE OF PRINTING MEDIUM BASED ON MEASUREMENT RESULTS

BACKGROUND OF THE INVENTION

Field of the Invention

The present invention relates to an information processing apparatus, a printing apparatus, an information processing method, and a program.

Description of the Related Art

When printing is performed with a printing apparatus, it is known that printing is performed by using controlled parameters appropriate for a type of printing medium. Japanese Patent Laid-Open No. 2016-215591 describes that, in order to perform printing by using appropriate controlled parameters, a plurality of characteristic values of a printing medium to be printed is measured and the type of the printing medium is identified by making a comparison with reference values.

SUMMARY OF THE INVENTION

However, errors in a sensor that measures the characteristic values of a printing medium, individual differences among printing media, differences in measurement environment, and the like, influence measured values, so the type of printing medium may not be identified with sufficient accuracy when references prepared in advance are used.

The present invention provides accurate identification of the type of a printing medium by increasing the opportunity to improve the accuracy of determining the type of a printing medium based on measurement results.

According to embodiments of the present invention, an information processing apparatus includes: a first acquisition unit configured to acquire a measurement result obtained by measuring a characteristic value of a printing medium to be printed; a second acquisition unit configured to acquire a reference characteristic value set in advance for each of types of printing medium to identify a type of the printing medium; an input unit configured to input information indicating a type of the printing medium to be printed; a control unit configured to control an operation to determine a type of the printing medium to be printed; and a change unit configured, based on the measurement result acquired by the first acquisition unit, to change the reference characteristic value set in advance for the type of printing medium indicated by the information input by the input unit. The control unit is configured to determine the type of printing medium indicated by the information input by the input unit as the type of the printing medium to be printed. The control unit is configured to be capable of executing a measurement mode and a designation mode. In the measurement mode, the type of the printing medium to be printed is determined by using the measurement result acquired by the first acquisition unit and the reference characteristic values set in advance and acquired by the second acquisition unit. In the designation mode, the type of the printing medium to be printed is determined without using the measurement result acquired by the first acquisition unit. The control unit is configured to, even in the designation mode, cause the first acquisition unit to acquire the measurement result and cause the change unit to change the reference characteristic value set in advance for the type of printing medium indicated by the information input by the input unit based on the measurement result acquired by the first acquisition unit.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

FIG. 4 is a diagram showing the block configuration of a control system of the printing apparatus in the embodiment.

FIG. 6 is a flowchart showing a printing medium determination process in the embodiment.

FIG. 9A and FIG. 9B are tables showing characteristic values stored in an EEPROM in the embodiment.

FIG. 12 is a table showing an example of measured values that are measured in the embodiment.

FIG. 13 is a table showing determination results in the printing medium determination process of the embodiment.

FIG. 14A and FIG. 14B are tables showing priority assignment in the embodiment.

FIG. 15A to FIG. 15D are tables for illustrating a method of calculating a characteristic value in the embodiment.

DESCRIPTION OF THE EMBODIMENTS

First Embodiment

Overall Configuration

Figure 1A:
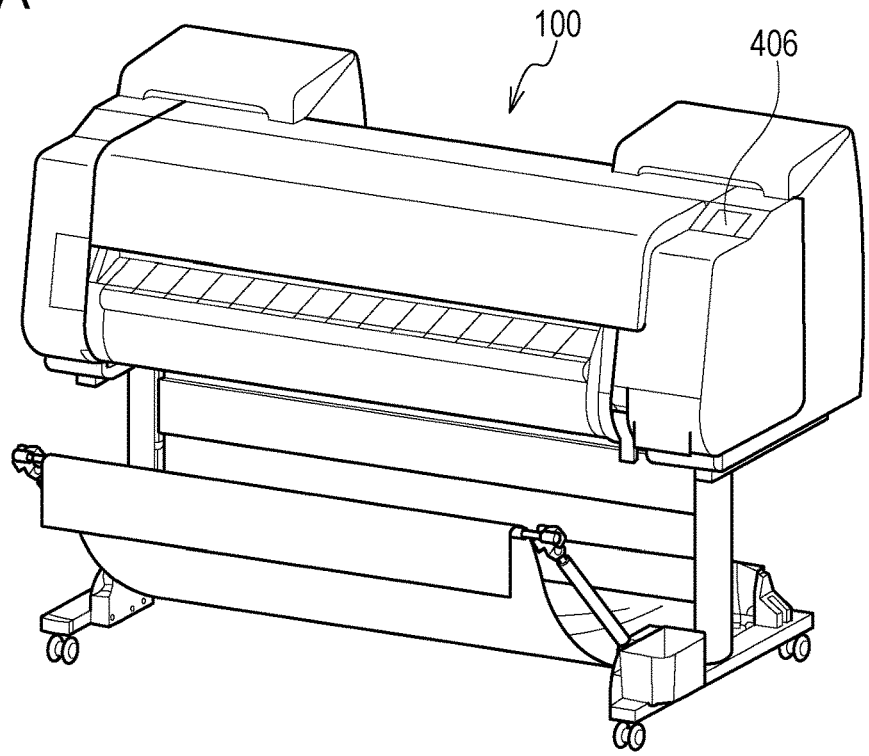
FIG. 1A and FIG. 1B are perspective views showing the configuration of a printing apparatus according to an embodiment.
Figure 1B:
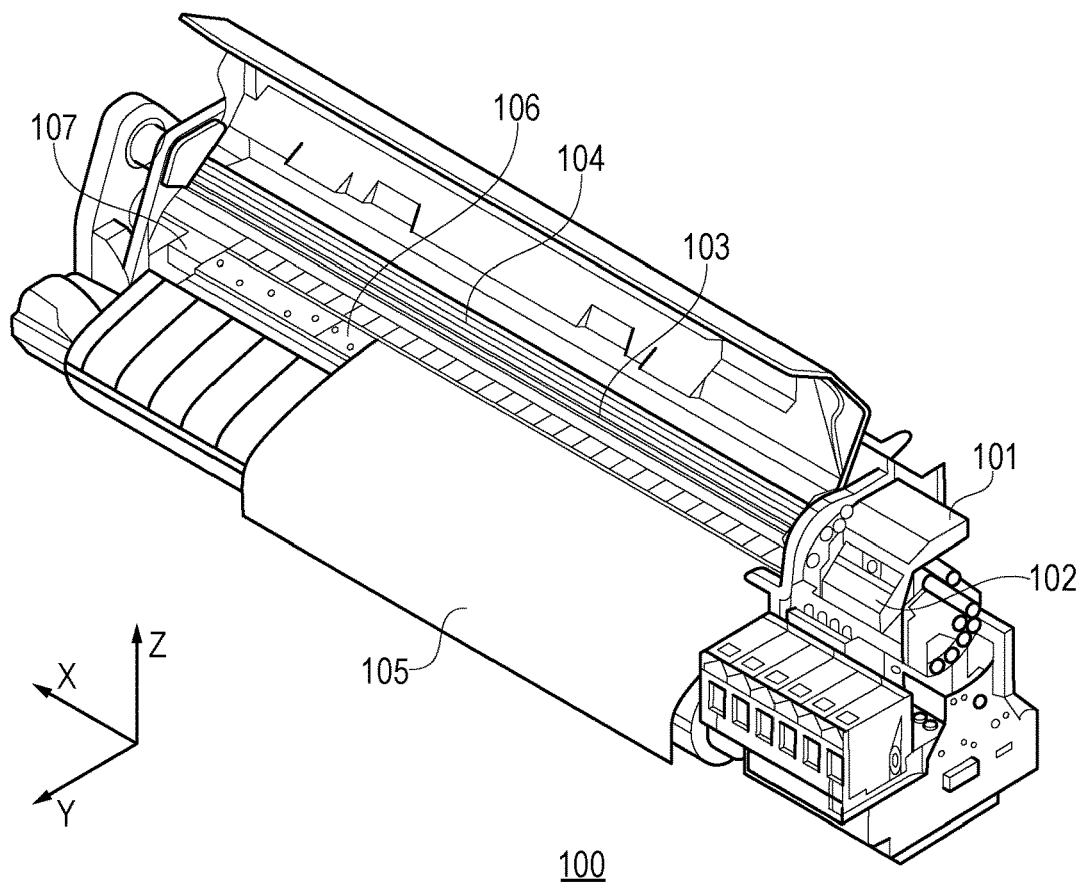

FIG. 1A and FIG. 1B are perspective views showing the configuration of a printing apparatus 100 equipped with casters and a basket for sheet discharge. FIG. 1A shows the overall outer appearance. FIG. 1B shows an internal structure with a top cover open. The printing apparatus 100 in the present embodiment prints by applying ink droplets as a printing material onto a printing medium with an ink jet printing method. A printing medium is conveyed in a conveyance direction set to a Y direction. An ink jet printing apparatus including a so-called serial printing head will be described. With the serial printing head, a carriage 101 on which a printing head 102 is mounted prints while reciprocally moving in an X direction that intersects with the Y direction. Alternatively, an ink jet printing apparatus including a so-called line printing head may be used. With the line printing head, an array of nozzles is provided over a print swath in a direction to convey a printing medium. Alternatively, a multifunctional peripheral apparatus (MFP) that integrates not only a printing function but also a scanning function, a facsimile function, a sending function, or the like, may be used. Alternatively, an electrophotographic printing apparatus that uses powder toner as a printing material may be used. In the present embodiment, the function of an information processing apparatus for executing a process of determining a printing medium to be used (described later) is equipped for the printing apparatus 100.

The printing apparatus 100 has an input/output unit 406 at its top. The input/output unit 406 is an operation panel and shows an ink level and candidates for a type of printing medium on a display. When a user operates keys on the input/output unit 406, the user is able to select a type of printing medium or configure the settings for printing.

The carriage 101 includes an optical sensor 201 (FIG. 2) and the printing head 102. The printing head 102 has a discharge port face at which discharge ports for discharging ink are provided. The carriage 101 is configured to be reciprocally movable in the X direction (carriage moving direction) along a shaft 104 via a carriage belt 103 by being driven by a carriage motor 415 (FIG. 4). In the present embodiment, the printing apparatus 100 is able to acquire a diffused reflection characteristic value or a specular reflection characteristic value and measure a distance between the carriage 101 and a printing medium 105 with the use of the optical sensor 201.

The printing medium 105, such as rolled paper, is conveyed on a platen 106 in the Y direction by a conveyor roller (not shown). While the carriage 101 is moving in the X direction above the printing medium 105 conveyed on the platen 106 by the conveyor roller, ink droplets are discharged from the printing head 102. Thus, printing operation is performed. As the carriage 101 moves to an end of printing area on the printing medium 105, the conveyor roller conveys the printing medium 105 by a certain amount and moves the carriage 101 to a position at which the printing head 102 is able to print on an area to be subjected to the next scanning and printing. Through a repetition of the above-described operations, an image is printed.

Configuration of Carriage

Figure 2:
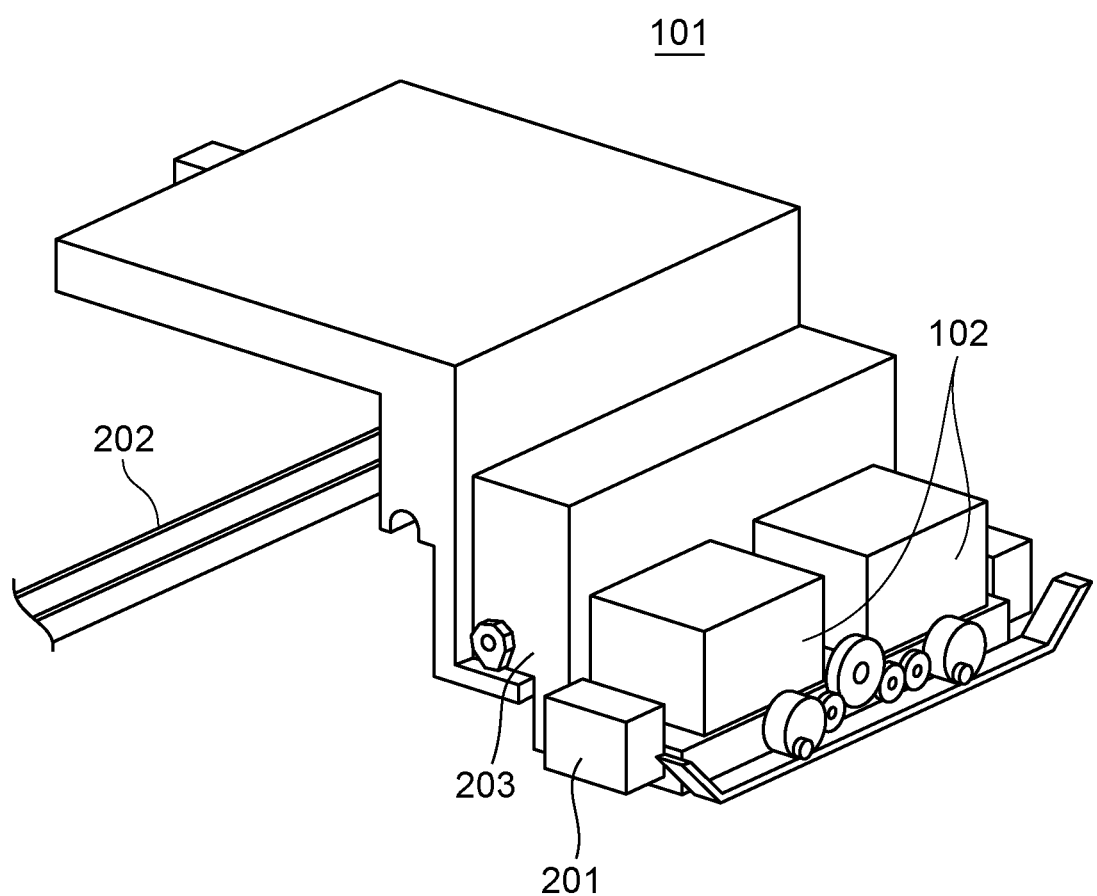
FIG. 2 is a view showing the configuration of a carriage according to the embodiment.

FIG. 2 is a view that shows the configuration of the carriage 101. The carriage 101 includes a translator 202 and a head holder 203. The head holder 203 holds the printing head 102 and the optical sensor 201 that is a reflection sensor. As shown in FIG. 2, the optical sensor 201 is arranged such that a bottom face is equal to or higher in level than the bottom face of the printing head 102.

Configuration of Optical Sensor

Figure 3:
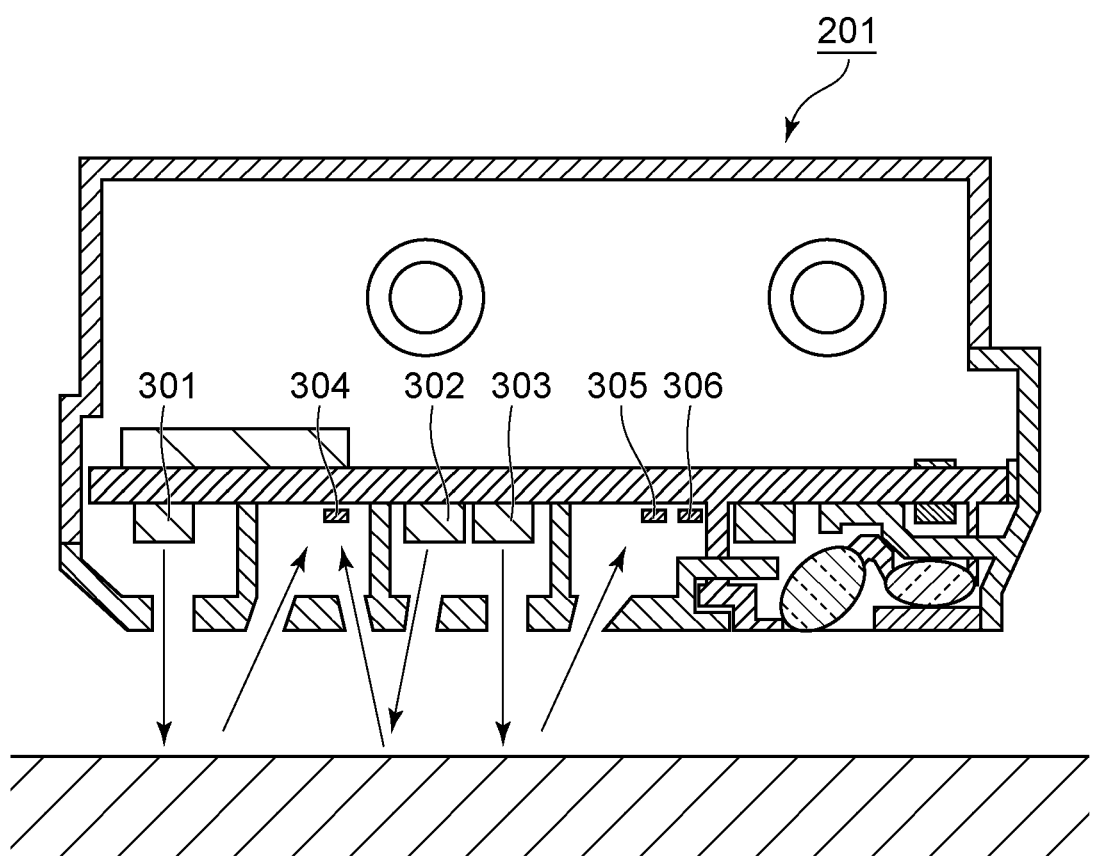
FIG. 3 is a view showing the configuration of an optical sensor in the embodiment.

FIG. 3 is a schematic cross-sectional view showing the configuration of the optical sensor 201. The optical sensor 201 includes a first LED 301, a second LED 302, a third LED 303, a first photodiode 304, a second photodiode 305, and a third photodiode 306 as optical elements. The first LED 301 is a light source having an angle of irradiation of a normal line (90°) to the surface (measurement surface) of the printing medium 105. The first photodiode 304 receives light irradiated from the first LED 301 and reflected from the printing medium 105 at an angle of 45° with respect to the Z direction. In other words, an optical system that detects a so-called diffused reflection component of reflected light from the printing medium 105 is formed.

The second LED 302 is a light source having an angle of irradiation of 60° to the surface (measurement surface) of the printing medium 105 with respect to the Z direction. The first photodiode 304 receives light irradiated from the second LED 302 and reflected from the printing medium 105 at an angle of 60° with respect to the Z direction. In other words, an angle of emitting light and an angle of receiving light are equal to each other, and an optical system that detects a so-called specular reflection component of reflected light from the printing medium 105 is formed.

The third LED 303 is a light source having an angle of irradiation of a normal line (90°) to the surface (measurement surface) of the printing medium 105. The second photodiode 305 and the third photodiode 306 each receive light irradiated from the third LED 303 and reflected from the printing medium 105. The second photodiode 305 and the third photodiode 306 measure a distance between the optical sensor 201 and the printing medium 105 because the amount of light received changes with a distance between the optical sensor 201 and the printing medium 105.

In the present embodiment, the optical sensor 201 is installed on the carriage 101. An optical sensor may be provided in another mode. For example, an optical sensor may be fixed to the printing apparatus 100 or may be a measurement device for measuring a characteristic value, such as a diffused reflection value and a specular reflection value, of a printing medium, separated from the printing apparatus 100, and may be in a mode to send a characteristic value measured by the measurement device to the printing apparatus 100.

Block Chart

FIG. 4 is a diagram showing the block configuration of a control system of the printing apparatus 100. A ROM 402 is a non-volatile memory. For example, a control program for controlling the printing apparatus 100 or a program for implementing the operations of the present embodiment are stored in the ROM 402. The operations of the present embodiment are, for example, implemented when the CPU 401 reads the program stored in the ROM 402 and runs the program by loading the program onto the RAM 403. The RAM 403 is also used as a working memory of the CPU 401. The EEPROM 404 stores data to be held even when the power of the printing apparatus 100 is turned off. At least the CPU 401 and the ROM 402 implement the function of the information processing apparatus for executing a printing medium determination process (described later). The EEPROM 404 stores characteristic values of each of printing media, which are used as predetermined references, and categories of the printing media. Categories are those roughly classified from types of printing media. In the present embodiment, five categories, that is, glossy paper, plain paper, coated paper, photo paper, and special, are set. For example, types of printing media are classified into a glossy paper category when a printing medium is standard glossy paper, and are classified into a plain paper category when a printing medium is premium plain paper. Printing media also include a medium that is not a paper medium; however, in the present embodiment, the word "paper" is used and provided to a user. Characteristic values of printing media may be stored in not a storage medium in the printing apparatus 100 but an external memory, such as a ROM of a host computer and a server.

An interface (I/F) circuit 410 connects the printing apparatus 100 and a network, such as an external LAN. The printing apparatus 100 sends or receives various jobs, data, and the like, to or from an apparatus, such as an external host computer, through the I/F circuit 410.

The input/output unit 406 includes an input unit and an output unit. The input unit functioning as input unit receives an instruction to turn on the power from a user, an instruction to perform printing, and an instruction to set various functions. The output unit functioning as notification unit displays various device information, such as power-saving mode, or a settings screen for various functions that the printing apparatus 100 is able to execute. In the present embodiment, the input/output unit 406 is the operation panel provided in the printing apparatus 100, and the input/output unit 406 is connected to a system bus 416 via an input/output control circuit 405 so as to be able to send or receive data to or from the system bus 416. In the present embodiment, the CPU 401 executes control to provide information about the output unit.

Alternatively, the input unit may be a keyboard of an external host computer and may be configured to be able to receive an instruction of a user from the external host computer. The output unit may be a display connected to an LED display, an LCD display, or a host apparatus. Alternatively, when the input/output unit 406 is a touch panel, the input/output unit 406 is able to receive an instruction from a user with a software key. Alternatively, the input/output unit 406 may be a speaker and a microphone, may use input from a user as voice input, and may use information to be provided to a user as voice output.

An information processing apparatus that includes a CPU and a ROM having similar functions to those of the CPU 401 and the ROM 402 and that is externally connected to the printing apparatus 100 may execute a printing medium determination process (described later) and determine a printing medium to be used in the printing apparatus 100.

When a measurement is performed with the optical sensor 201, an LED control circuit 407 is driven by the CPU 401, and a predetermined LED in the optical sensor 201 is controlled so as to light up. Each of the photodiodes of the optical sensor 201 outputs a signal commensurate with received light. The output signal is converted to a digital signal by an A/D conversion circuit 408 and is once saved in the RAM 403. Data to be saved is stored in the EEPROM 404 when the power of the printing apparatus 100 is turned off.

The printing head control circuit 411 supplies a drive signal commensurate with printing data to a nozzle drive circuit including a selector and a switch mounted on the printing head 102 and controls the printing operation of the printing head 102, such as the driving sequence of nozzles. For example, when data to be printed is sent from the outside to the I/F circuit 410, the data to be printed is once saved in the RAM 403. The printing head control circuit 411 drives the printing head 102 based on printing data converted from the data to be printed to printing data for printing. After that, an LF (line feed) motor drive circuit 412 drives an LF motor 413 based on the bandwidth of printing data, and the like, and the conveyor roller connected to the LF motor 413 rotates to convey a printing medium. A CR (carriage) motor drive circuit 414 causes the carriage 101 to scan via the carriage belt 103 by driving the CR (carriage) motor 415.

Data that is sent from the I/F circuit 410 contains not only data to be printed but also data of details set by a printer driver. Data to be printed can be, for example, received from the outside via the I/F circuit 410 and stored in a storage unit or stored in advance in a storage unit, such as a hard disk. The CPU 401 reads image data from the storage unit, controls an image processing circuit 409, and converts (binarizing process) the image data into printing data to use the printing head 102. The image processing circuit 409, other than the binarizing process, executes various image processing, color space conversion, HV conversion, gamma correction, and rotation of image.

Method of Selecting Type of Printing Medium

By identifying the type of the printing medium 105 to be printed, parameters such as the maximum amount of ink usage, the level of the printing head 102, a force attracting the printing medium 105 to the platen 106, the degree of correction in the amount of conveyance of the printing medium 105 are set. Another control parameter that affects the characteristics of the printing medium 105 may be used.

In the present embodiment, there are five modes in selecting a type of printing medium. The five modes are a fixed mode, a manual mode, an estimated manual mode, an estimated automatic mode, and a bar code mode. Of these modes, the estimated manual mode and the estimated automatic mode are measurement modes for estimating a type of printing medium from measurement results. The manual mode, the fixed mode, and the bar code mode are designation modes for designating a type of printing medium by a user or determining a type of printing medium through designation of mode without using a measurement result.

In the fixed mode, a type of printing medium set in advance by the user is automatically determined as the type of the printing medium to be printed.

In the manual mode, the categories of printing media are displayed on the input/output unit 406, and the user selects a category and further selects a type of printing medium from the selected category to determine the type of the printing medium to be printed.

In the estimated manual mode, the characteristics of the printing medium 105 to be printed are measured with the optical sensor 201, and candidates for the type of the printing medium are displayed on the input/output unit 406 based on the measurement results. When the user selects a type of printing medium from the input/output unit 406, the type of the printing medium to be printed is determined.

In the estimated automatic mode, the characteristics of the printing medium 105 to be printed are measured with the optical sensor 201, and candidates for the type of printing medium are displayed on the input/output unit 406 based on the measurement results. When no operation has been performed by the user for a predetermined time, the top one of the candidates displayed for the type of printing medium is determined as the type of the printing medium to be printed. When a type of printing medium has been selected by the user, the selected type is determined as the type of the printing medium to be printed.

In the bar code mode, information that indicates a type of printing medium is printed in advance on a printing medium as a bar code, and the type of the printing medium to be printed is determined by reading the bar code.

Figure 5A:
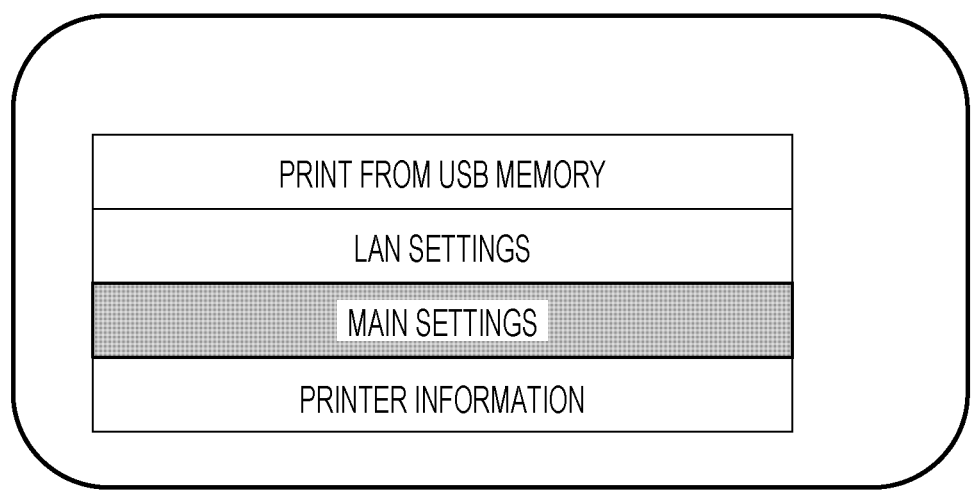
FIG. 5A to FIG. 5D are views showing display modes of an input/output unit in the embodiment.

The above five modes can be switched by the user. FIG. 5A shows a home screen displayed on the input/output unit

406. FIG. 5A shows a state when "MAIN SETTINGS" is selected from among the items displayed on the home screen. When an item is selected, the selected item is highlighted, and the next screen is displayed. In FIG. 5A to FIG. 5D, the item is highlighted such that the background of the item is varied in color from the other items and the frame of the item is widened.

Figure 5B:
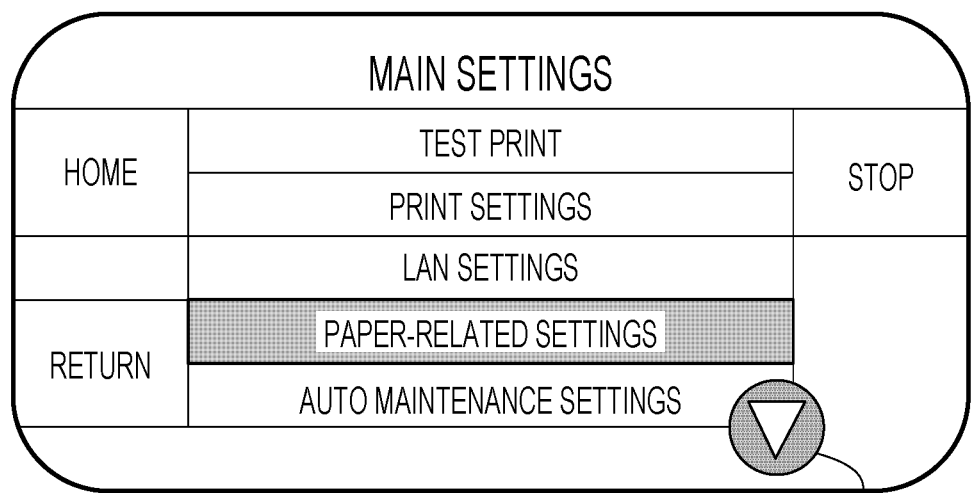
Figure 5C:
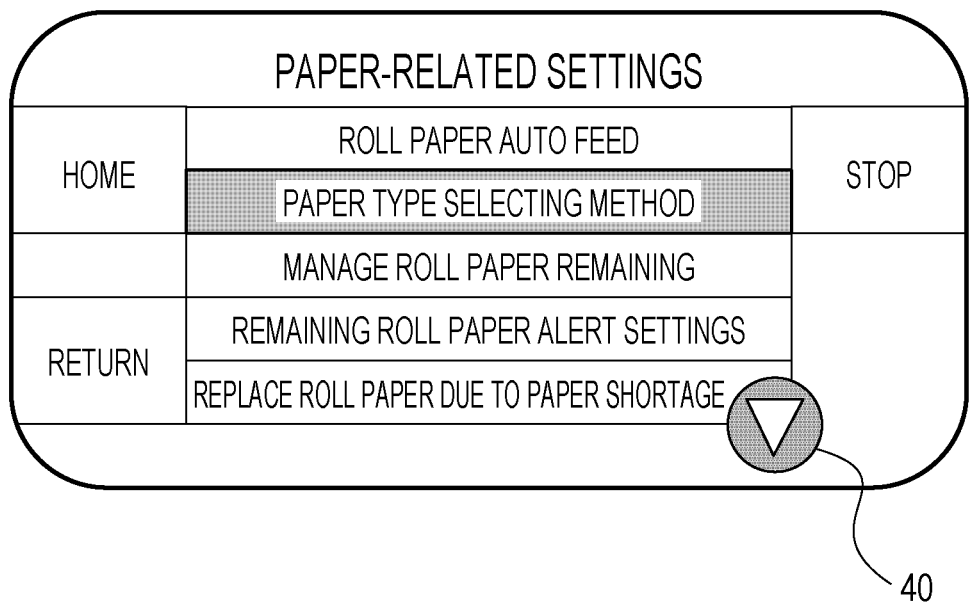
Figure 5D:
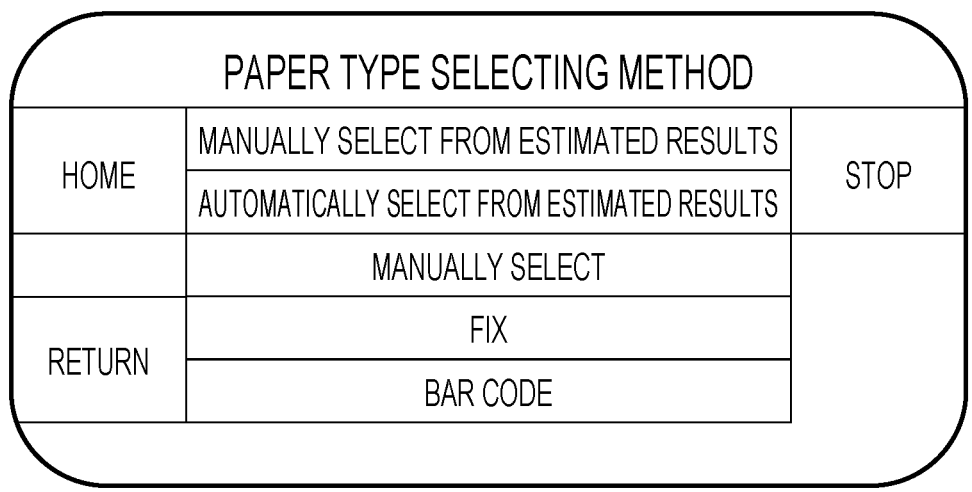

When "MAIN SETTINGS" is selected on the home screen, a main settings screen as shown in FIG. 5B is displayed. When a button 40 displayed in FIG. 5B is touched, display of the screen can be scrolled downward. When "STOP" is touched, display of FIG. 5B is switched to display of the home screen of FIG. 5A. When "PAPER-RELATED SETTINGS" is selected on the main settings screen, "PAPER-RELATED SETTINGS" is highlighted as shown in FIG. 5B, and a paper-related settings screen as shown in FIG. 5C is displayed. FIG. 5C shows a state when "PAPER TYPE SELECTING METHOD" is selected on the settings screen. On the paper-related settings screen, items for setting printing medium information in the printing apparatus 100 are displayed. The items include, for example, an item for setting the level of the printing head 102 at the time of printing and an item for setting a cut speed at the time of cutting rolled paper. When "PAPER TYPE SELECTING METHOD" is selected on the paper-related settings screen of FIG. 5C, a paper type selecting method settings screen as shown in FIG. 5D is displayed. The user is able to set the above-described mode for selecting a type of printing medium on this screen. When "AUTOMATICALLY SELECT FROM ESTIMATED RESULTS" shown in FIG. 5D is selected, the estimated automatic mode is executed. When "MANUALLY SELECT FROM ESTIMATED RESULTS" is selected, the estimated manual mode is executed.

Common Flow Among Modes

FIG. 6 is a flowchart showing a printing medium determination process of determining a type of a printing medium 105 to be printed. The printing medium determination process is a process that is executed after a mode in selecting a type of printing medium is set.

In the following printing medium determination process, measured values are obtained as new information for characteristic values of a type of printing medium, selected by a user, and the predetermined characteristic values are changed based on the measured values so as to be brought close to the measured values. Through such learning, characteristic values with which a type of a printing medium can be more accurately selected are obtained.

For the fixed mode, the manual mode, and the bar code mode, when information is displayed on the input/output unit 406, measurement results of the characteristics of a printing medium, measured with the optical sensor 201, are not used. However, in any mode, a measurement of the characteristics of a printing medium with the optical sensor 201 and learning based on the measurement are performed. A measurement is performed even in modes other than the modes in which measured values are used, and learning is performed, with the result that characteristic values that can make it possible to accurately identify a type of printing medium are more likely to be obtained. In the present embodiment, the characteristic values of a printing medium are learned in all the modes. Alternatively, for example, learning may be performed only in the bar code mode in which the probability that a correct printing medium is selected is high.

The processes of step S101 to step S107 of FIG. 6 are implemented, for example, when the CPU 401 shown in FIG. 4 reads the program stored in the ROM 402 onto the RAM 403 and runs the program. The printing medium determination process may be executed by software on the host apparatus. In the present embodiment, since the input/output unit 406 is the operation panel provided in the printing apparatus 100, candidates for a printing medium are informed by displaying the names of printing media on the operation panel. The input/output unit 406 may be a combination of the host apparatus and the display connected to the host apparatus. When the input/output unit 406 is a speaker that has a microphone function and that is able to input or output voice, candidates for a printing medium are informed through the speaker, and a printing medium is selected by a user inputting the name of the printing medium or an associated reference sign by voice to the microphone.

Figure 7A:
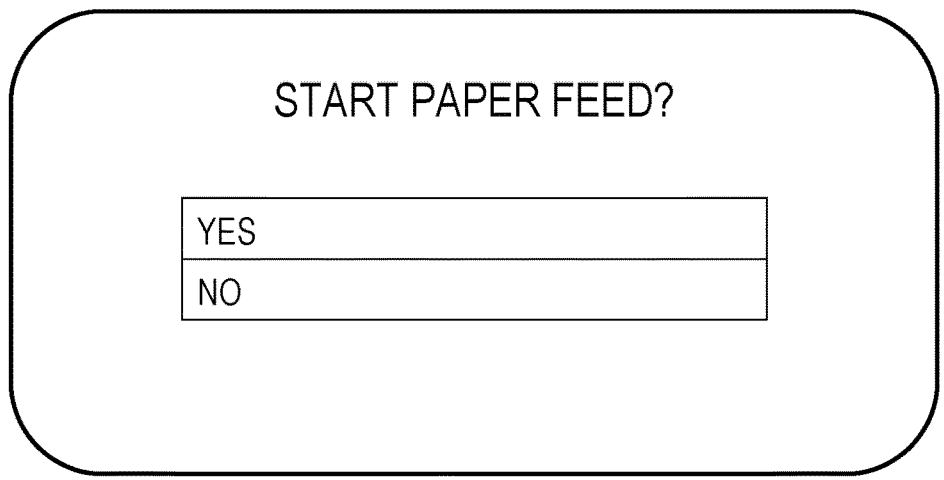
FIG. 7A to FIG. 7G are views showing display modes of the input/output unit in the embodiment.

As the CPU 401 receives an instruction to start sheet feed from a user through the operation panel that is the input/output unit 406, the CPU 401 executes a process of feeding the printing medium 105. FIG. 7A is an example of display on the operation panel to wait for input of an instruction to start the sheet feed process. The operation panel is a touch panel with which a user is able to make touch input. When "YES" is touched, sheet feed is started.

When "YES" is selected in FIG. 7A and sheet feed is started, the printing medium 105 is conveyed by the conveyor roller to a position where the optical sensor 201 is able to detect the printing medium 105 on the platen 106. After the printing medium 105 is conveyed, the carriage 101 moves in the X direction above the printing medium 105, and the diffused reflection value, specular reflection value, and thickness (hereinafter, paper thickness) of the printing medium 105 are acquired with the optical sensor 201 (step S101). A diffused reflection value corresponds to the whiteness of a printing medium. A specular reflection value corresponds to the glossiness of a printing medium. The printing medium determination process may be executed by using the width of a printing medium in the X direction as one of the characteristics of the printing medium. A position where the characteristics of a printing medium are measured may be one, or an average of measurement results at multiple points may be used. A measurement of the characteristics may be performed in a state where the optical sensor 201 is stopped or may be performed while the optical sensor 201 is being moved. Measured values are once stored in a memory such as the RAM 403.

Subsequently, the CPU 401 checks the mode in determining the set printing medium in step S102. The mode is stored in the ROM 402. The CPU 401 executes a process appropriate for the set mode. The process proceeds to step S103 in the estimated manual mode. The process proceeds to step S104 in the estimated automatic mode. The process proceeds to step S105 in the manual mode. The process proceeds to step S106 in the fixed mode. The process proceeds to step S107 in the bar code mode. A type of a printing medium to be printed is determined in step S103 to step S107, and the printing medium determination process is ended.

Hereinafter, a process appropriate for each of the modes in step S103 to step S107 will be described.

Estimated Manual Mode

In the estimated manual mode, measured values are obtained as new information for characteristic values of a type of printing medium, selected by a user, and the predetermined characteristic values are changed based on the measured values so as to be brought close to the measured values. Through such learning, characteristic values with which a type of a printing medium can be more accurately selected are obtained.

Figure 8:
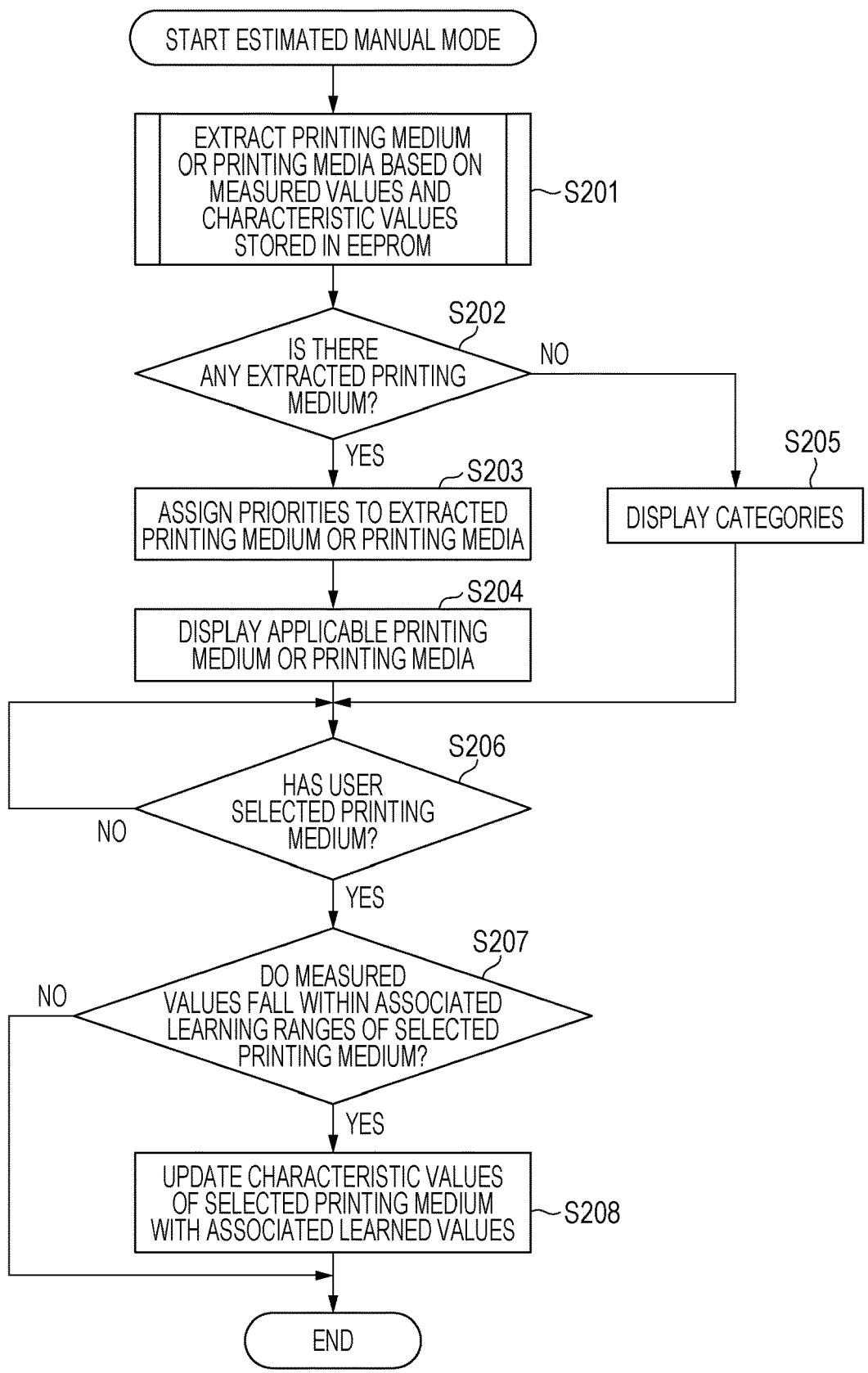
FIG. 8 is a flowchart showing an estimated manual mode in the embodiment.

FIG. 8 is a flowchart showing the estimated manual mode of step S103.

Figure 10:
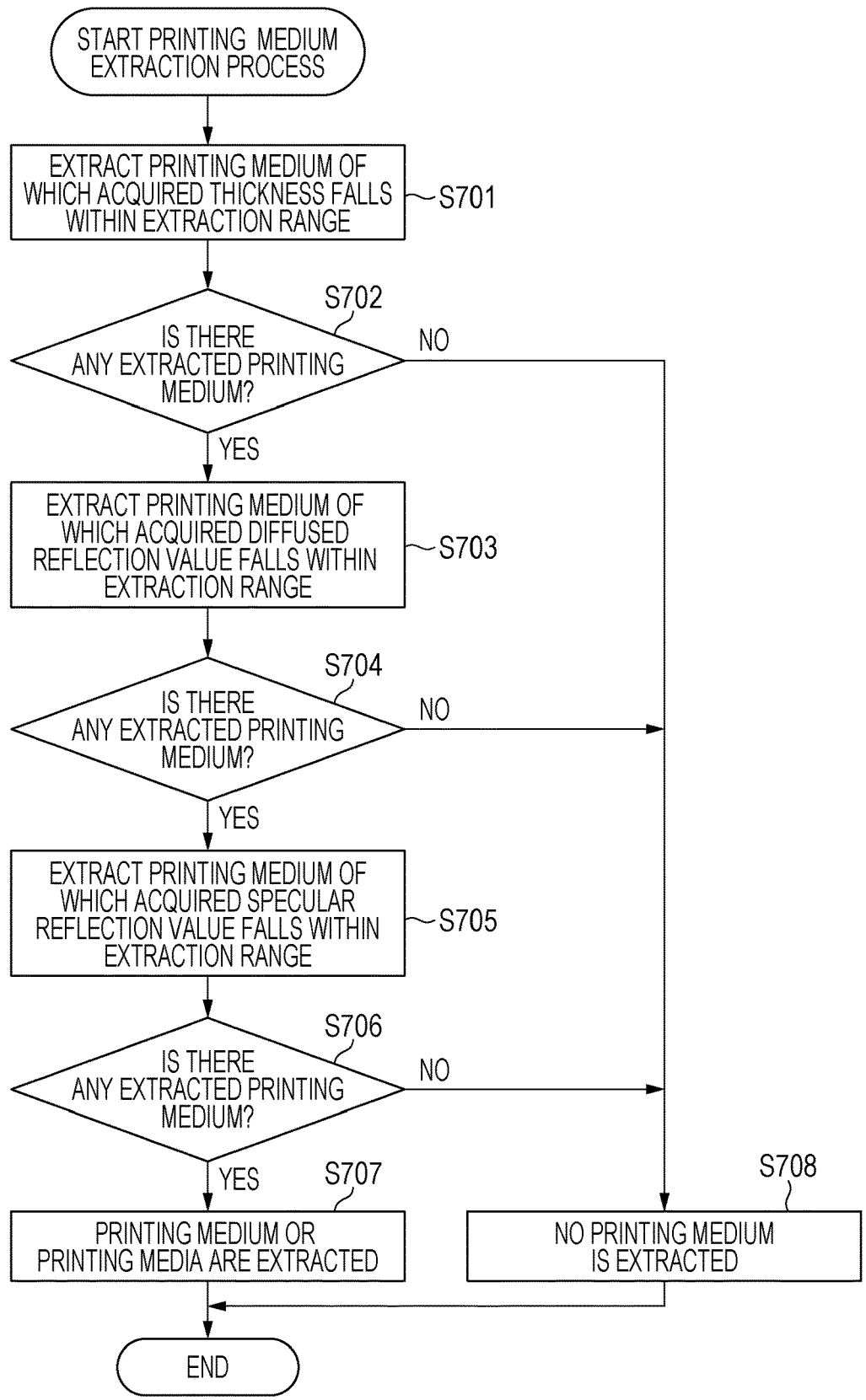
FIG. 10 is a flowchart showing a printing medium extraction process in the embodiment.

In step S201, the CPU 401 reads out the measured values acquired in step S101 of FIG. 6 from the memory, compares the measured values with the predetermined characteristic values of each printing medium, stored in the EEPROM 404, and extracts candidates for the type of printing medium. FIG. 10 is a flowchart of a process of extracting a type of printing medium in step S201.

Types of printing media of which a degree to which the characteristic values fall under the characteristics indicated by the measured values is higher than a predetermined degree are extracted. Details will be described below. FIG. 9A shows the characteristic values of each of the types of printing media, stored in the EEPROM 404. The characteristic values=$T_0$ when the characteristic values are initial values at the present. These values are set for reference values, and the type of the printing medium is identified by comparing the measured values with the reference values. The ranges of the reference values are defined as extraction ranges. Diffused reflection values and specular reflection values are values obtained by converting an output voltage from analog to digital with 10 bits. The output voltage is a voltage that the optical sensor 201 outputs upon receiving light. Each extraction range is a range from a minimum value (min value) to a maximum value (max value) with a center set to a middle value of each of characteristic values of a printing medium.

In step S701, a type of printing medium of which the acquired paper thickness falls within the extraction range of paper thickness, stored in the storage unit (EEPROM) 404, is extracted. In the present embodiment, the extraction range of paper thickness is ±50 µm from the central value.

It is determined whether there is any type of printing medium extracted (step S702).

When no type of printing medium is extracted, information indicating that there is no extracted type of printing medium is stored in the RAM 403, and the printing medium extraction process is ended.

When there is a type of printing medium extracted in step S702, a type of printing medium of which the acquired diffused reflection value falls within the extraction range of diffused reflection value, stored in the storage unit (EEPROM) 404, is extracted (step S703). As shown in FIG. 9A, the extraction range of diffused reflection value is a range of ±5 from the central value. Here, it is determined whether there is a type of printing medium extracted (step S704). When there is no applicable type of printing medium, information indicating that there is no extracted type of printing medium is stored in the RAM 403, and the printing medium extraction process is ended.

When there is a type of printing medium extracted in step S704, a type of printing medium of which the acquired specular reflection value falls within the extraction range of specular reflection value, stored in the storage unit (EEPROM) 404, is extracted (step S705). As shown in FIG. 9A, the extraction range of specular reflection value is a range of ±5 from the central value. Here, it is determined whether there is a type of printing medium extracted (step S706). When there is no applicable type of printing medium, information indicating that there is no extracted type of printing medium is stored in the RAM 403, and the printing medium extraction process is ended.

When there is a type of printing medium extracted in step S706, information indicating that the extracted type of printing medium is stored in the RAM 403, and the printing medium extraction process is ended.

When the printing medium extraction process is ended in step S201, it is determined in step S202 whether there is any extracted printing medium. The determination is performed by the CPU 401 reading out the information stored in the RAM 403 in the printing medium extraction process of FIG. 10.

When there is a type of printing medium extracted in step S202, the type of printing medium is assigned with a priority in order of closeness of the characteristic values of an extracted type of printing medium to the measured values (step S203). A method of determining the order of display will be described in detail later.

Figure 7B:
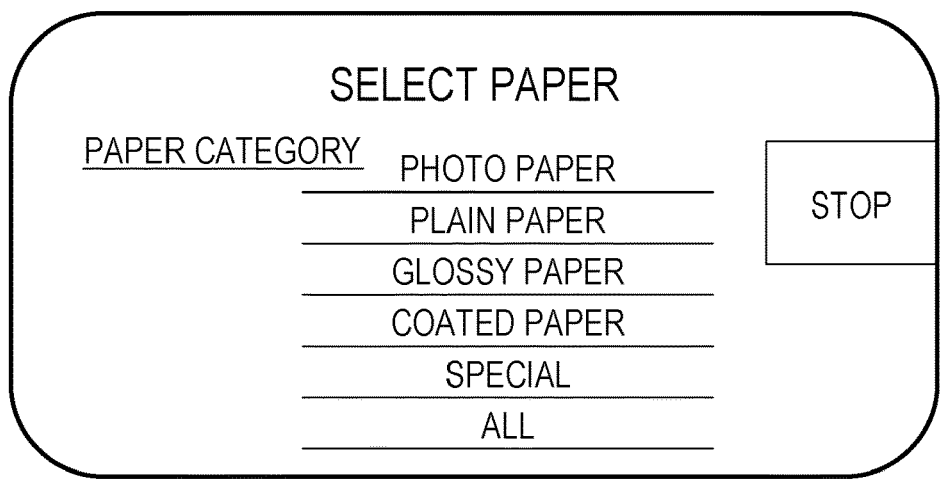
Figure 7C:
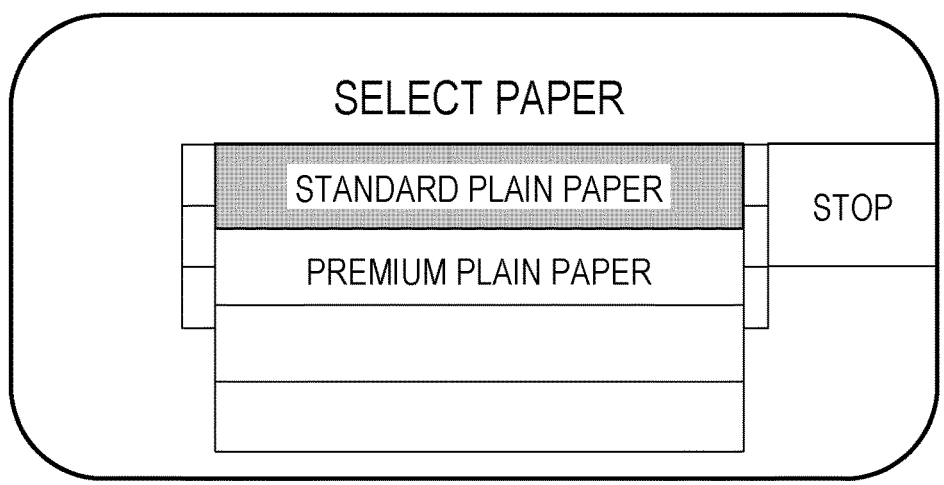
Figure 7D:
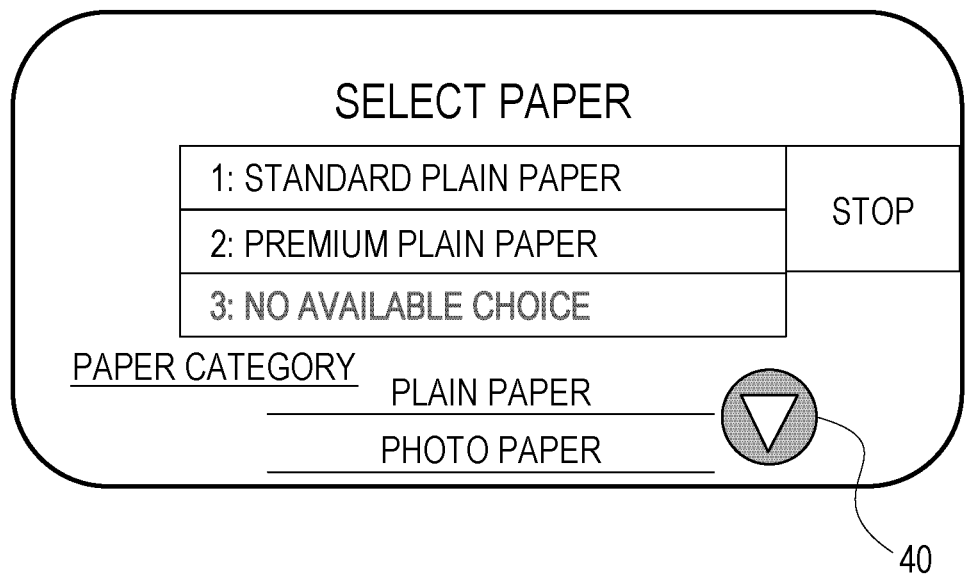

As shown in FIG. 7D, the names of the types of printing media are displayed from the top in descending order of priority determined in step S203 (step S204).

FIG. 7D shows the names of printing media in descending order of priority with reference numerals 1 to 3 prefixed to the names of printing media. Selection of a type of printing medium is made by touching any one of the names of printing media displayed. Here, the priority of standard half-glossy paper to which number 1 is assigned is the highest. Codes may be any codes as long as the codes can indicate the level of priority, and may be codes other than numerals. A display method is not limited thereto and may be any method as long as a user can recognize the order of priority.

In FIG. 7D, candidates for a printing medium can be displayed up to three from the top; however, since the number of the extracted types of printing media is two, only two printing media are displayed in FIG. 7D. A user is informed that there is no third candidate by displaying "NO AVAILABLE CHOICE" in the third field in light color (or dark color) so as to be less attractive than the names of the above-described two printing media. For example, when the background color of the operation panel is black, two printing media are displayed in white color and the text "NO AVAILABLE CHOICE" is displayed in gray color lower in brightness than white color. Categories of paper are displayed below the text "NO AVAILABLE CHOICE". In this way, when a printing medium that a user desires is not included in printing media displayed on the input/output unit 406, an individual printing medium is allowed to be selected in order to select a printing medium of another type. In the present embodiment, the category to which a type of printing medium in the first place belongs is displayed at the top. By displaying categories having close characteristics at higher levels to make it easy to select those categories, even when a printing medium that a user desires is not included in candidates for a printing medium, time and effort that take until the category of a desired printing medium is selected can be reduced.

Figure 11A:
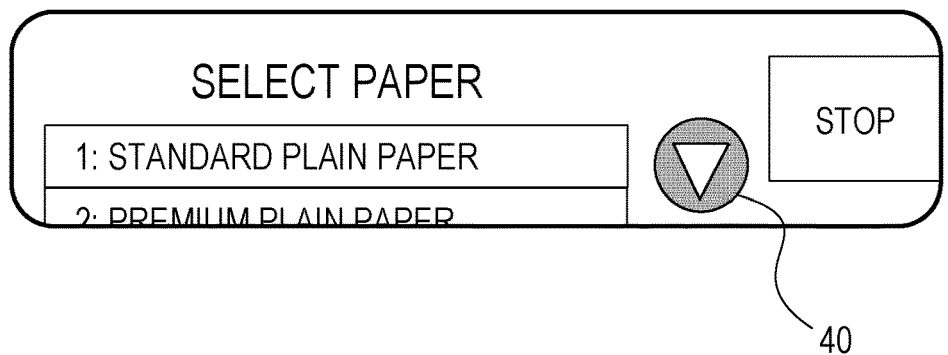
FIG. 11A to FIG. 11C are views showing other modes of the input/output unit.
Figure 11B:
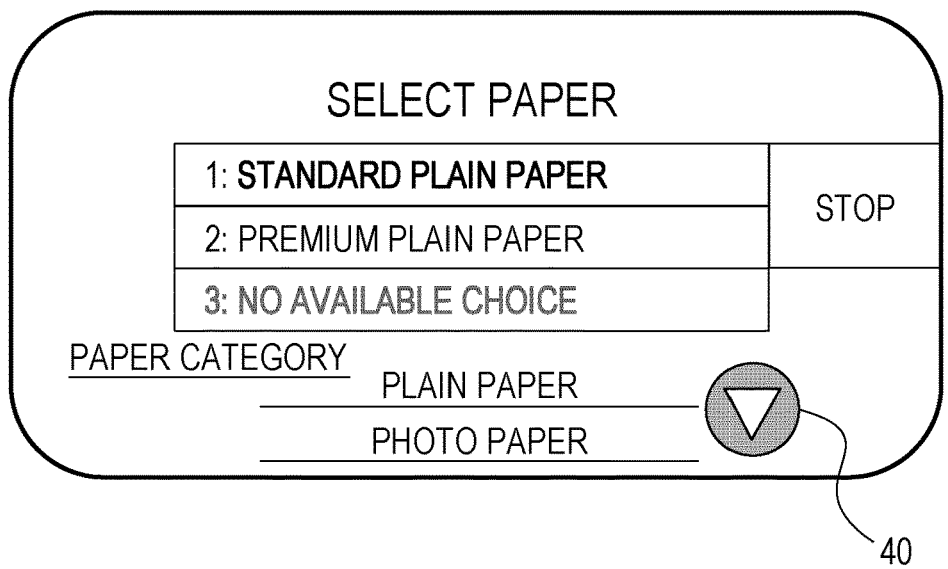
Figure 11C:
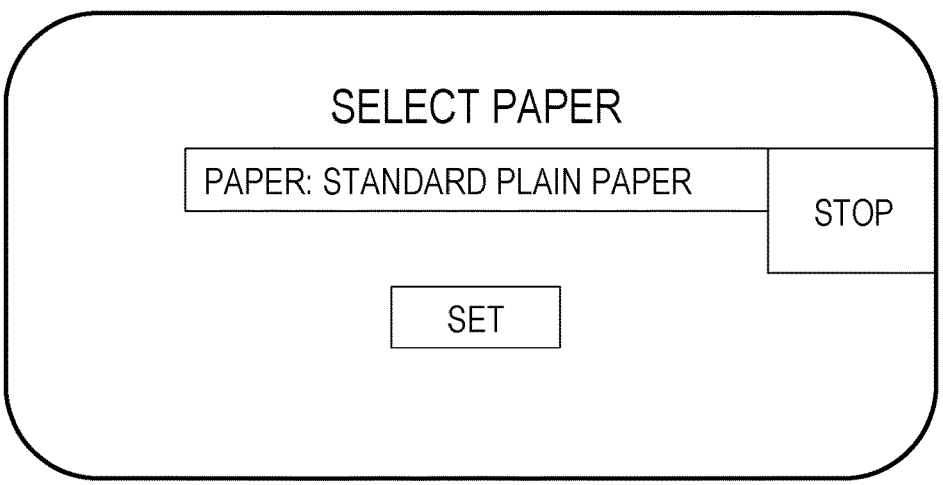

FIG. 11A to FIG. 11C show methods of displaying candidates for a type of printing medium on the input/output unit 406 in other modes. As shown in FIG. 11A, when not all the extracted candidates for a type of printing medium can be displayed on the operation panel, the input/output unit 406 may be configured such that a lower-level candidate can be displayed through scroll operation, or the like. Alternatively, candidates do not need to be displayed in order from higher level as long as a user can recognize the order of priority. The name of the top printing medium may be displayed at the center of the operation panel. Alternatively, as shown in FIG. 11B, the level of priority may be indicated by increasing the size of characters representing the name of a printing medium having a higher level of priority or displaying the characters in boldface. Categories are displayed below the text "PAPER CATEGORY"; however, categories may be displayed without any text meaning "PAPER CATEGORY". Alternatively, not categories but types of printing media other than candidates for a printing medium may be displayed below the candidates.

Alternatively, as shown in FIG. 11C, only a printing medium having a priority in the first place may be displayed. When a user desires to select another one of extracted printing media, the user can select a portion of the item of the printing medium displayed as standard plain paper in FIG. 11C. A display method may be configured such that, when the selection is input, the screen appears as shown in FIG. 7D and another printing medium can be selected.

When it is determined in step S202 that there is no extracted type of printing medium, categories are displayed on the operation panel as shown in FIG. 7B (step S205). When a category selected by a user is input, the types of printing media in the category are displayed as shown in FIG. 7C. Then, of the types of printing media displayed, the input of the selected type of printing medium is received. The input is made by touching the name of the printing medium displayed. FIG. 7B shows "ALL" at the bottom in addition to the categories of printing media. When "ALL" is selected, all the printing media are displayed in a predetermined order. Printing media may be displayed in recent order, that is, in order from the latest used printing medium.

When a user selects a type of printing medium on the input/output unit 406 in step S206, it is determined in step S207 whether the measured values fall within the learning ranges of the selected printing medium. The learning ranges will be described here. By changing the characteristic values of a type of printing medium, selected by a user, based on measured values, the characteristic values that further increase the accuracy of extraction can be obtained. However, if learning is performed based on a measured value significantly different from a characteristic value set in advance (or changed through a learning process), a wrong value is learned, so a learning range that is the range of a measured value to be learned is set. A learning range is twice as large as an extraction range in the present embodiment. A learning range is a range for changing a characteristic value. When a measured value falls within the learning range of a selected printing medium, the characteristic value is changed based on the measured value. In the present embodiment, a learning range is a range of a predetermined value from the central value of a characteristic value and is a range of a value twice as large as the difference between the central value and the minimum value or the difference between the central value and the maximum value. For example, the extraction range of specular reflection value of standard glossy paper in FIG. 9A is from 95 to 105, that is, ±5 from the central value. Since the learning range takes on a range of ±10 from the central value, that is, twice as large as ±5, the learning range is from 90 to 110. Similarly, a diffused reflection value and a paper thickness each also take on a range twice as wide as the extraction range, so the learning range of diffused reflection value of standard glossy paper is from 90 to 110, and the learning range of paper thickness is from 90 to 290. The learning range is not limited thereto and may take on, for example, the same range as the extraction range or may be set to a learning range that varies among characteristics or types of printing media. When the measured values fall within the learning ranges of the selected type of printing medium, the process proceeds to step S208. In step S208, the characteristic values of the type of printing medium, selected in step S206, are updated with values changed based on the measured values, and the changed values are stored in the EEPROM 404. Thus, the printing medium determination process in the estimated manual mode ends. When the measured values do not fall within the learning ranges, the printing medium determination process in the estimated manual mode is ended without updating the characteristic values of the selected type of printing medium. An update of characteristic values will be described in detail later.

When the printing medium determination process ends and a printing preparation completes, the CPU 401 is in a state of waiting for a printing job from a user, and, upon receiving a printing job, starts printing. The CPU 401 may be configured to receive a printing job and store the printing job in the RAM 403 before the printing preparation completes, and start printing when the printing preparation completes. When the type of printing medium selected and input by a user from the input/output unit 406 is different from the type of printing medium in a job sent from a host computer to the printing apparatus 100, the CPU 401 may be configured not to update the characteristic values of the printing medium, stored in the EEPROM 404.

In the printing medium extraction process of FIG. 10, a type of printing medium having an appropriate paper thickness is extracted in step S701, a type of printing medium having an appropriate diffused reflection value is extracted in step S703, and a type of printing medium having an appropriate specular reflection value is extracted in step S705. The sequence to be extracted is not limited thereto, and, for example, a type of printing medium having an appropriate diffused reflection value may be extracted first.

When the optical sensor 201 is provided in a measurement device separated from the printing apparatus 100, the following mode is applicable. The characteristics of a printing medium set in the measurement device are measured first. Then, the acquired measured values are sent to the printing apparatus 100, a printing medium is extracted by the CPU 401 of the printing apparatus 100, and a candidate is provided to the input/output unit 406.

A method of determining the order of display of step S203 of the printing medium determination process and an update of the characteristic values of step S208 will be described below by way of a specific example. As shown in FIG. 12, the characteristics of the printing medium acquired in step S101 are (diffused reflection value, specular reflection value, paper thickness)=(103, 98, 225). FIG. 13 is a table showing determination results of the process of step S201. "APPLICABLE" represents a printing medium of which the measured value falls within the extraction range. "NOT APPLICABLE" represents a printing medium of which the measured value does not fall within the extraction range. A printing medium of which at least one of characteristic values does not fall within the extraction range is not subjected to determination in the next process. This is shown in FIG. 13 as "NOT DETERMINED".

In step S701, standard glossy paper, standard half-glossy paper, premium glossy paper, and thick glossy paper, which are the types of printing media of which the acquired paper thickness, that is, 190, falls within the extraction range of paper thickness shown in FIG. 9A, are extracted. Since there are the extracted types of printing media, affirmative determination is made in step S702, and the process proceeds to step S703.

In step S703, from among the printing media extracted in step S701, standard glossy paper, standard half-glossy paper, and thick glossy paper, which are the types of printing media of which the measured diffused reflection value, that is, 103, falls within the extraction range of diffused reflection value shown in FIG. 9A, are extracted. Since there are the extracted types of printing media, affirmative determination is made in step S704, and the process proceeds to step S705.

In step S705, from among the printing media extracted in step S703, printing media of which the measured specular reflection value falls within the extraction range of specular reflection value shown in FIG. 9A, are extracted. Here, standard glossy paper, standard half-glossy paper, and thick glossy paper are extracted. Since there are the extracted printing media, affirmative determination is made in step S706, and the process proceeds to step S707. In step S707, information indicating the extracted types of printing media is stored in the RAM 403.

Since there are the extracted types of printing media in step S202, the process proceeds to step S203. In step S203, the printing media are assigned with priorities such that the printing medium of which the characteristic values are closer to the measured values has a higher order of priority. Then, in step S204, the names of the extracted types of printing media are displayed from the top in order from the printing medium having a higher order of priority.

FIG. 14A and FIG. 14B are tables for illustrating a method of determining the order in step S203. In the present embodiment, the closeness between the central value and measured value of each characteristic is calculated with the following calculation method.

$$|(\text{Measured value} - \text{Central value of characteristic}) / (\text{Maximum value of characteristic} - \text{Central value of characteristic})|$$

A minimum value may be used instead of the maximum value of the characteristic.

Figure 7E:
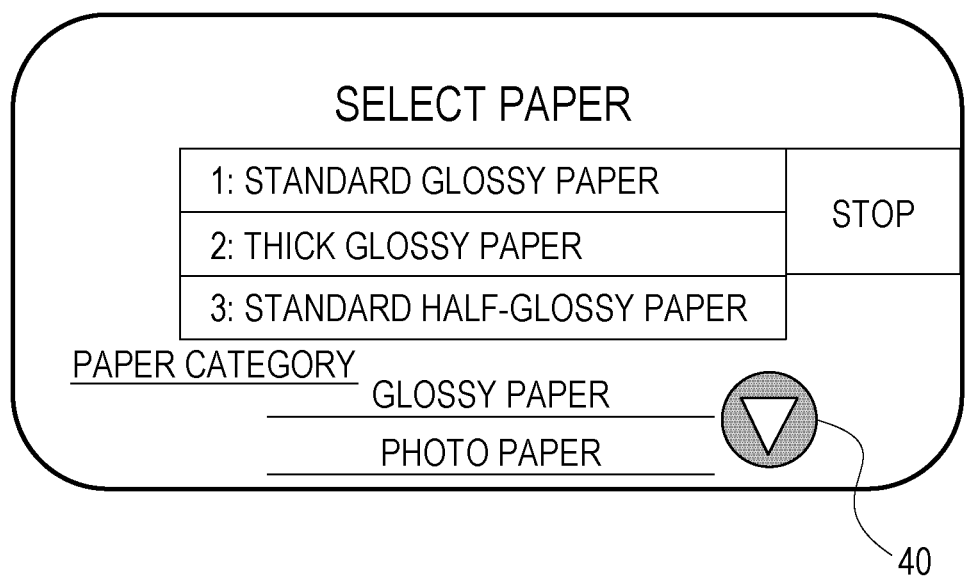

For example, when the specular reflection value of standard glossy paper is calculated, $|(103-100)/(105-95)|=0.6$. The above-described calculation is performed for the types of printing media extracted in step S201, and the values of closeness to the measured values of the characteristics are added. A printing medium having a less total value has characteristic values closer to the measured values. It is determined that a printing medium having a less total value is a type of a higher-level printing medium, and display is performed on the input/output unit 406 accordingly. Here, as shown in FIG. 7E, display is performed in order of standard glossy paper, thick glossy paper, and standard half-glossy paper.

The process of step S206 in the case where standard half-glossy paper that is displayed in the third place is selected by a user in step S207 will be described.

In step S207, it is determined whether the measured values acquired in step S101 fall within the learning ranges of standard half-glossy paper that is the selected type of printing medium. When the measured values fall within the learning ranges of all the characteristics, that is, diffused reflection value, specular reflection value, and paper thickness, it is determined that the measured values fall within the learning ranges of standard half-glossy paper. As shown in FIG. 9A, the extraction range of specular reflection value of standard half-glossy paper is from 94 to 104 that is a range of ±5 from the central value (middle) set to 99. As described above, the learning range takes on a range twice as wide as the extraction range from the same central value as the extraction range. The learning range of specular reflection value of standard half-glossy paper is from 89 to 109 that is a range of ±±10 from the central value set to 99. Similarly, the learning range of diffused reflection value of standard half-glossy paper is from 85 to 105, and the learning range of paper thickness is from 90 to 290. Since all the measured values (diffused reflection value, specular reflection value, paper thickness)=(103, 98, 225) fall within the above-described learning ranges, the process proceeds to step S208.

In step S208, the characteristic values of the type of printing medium selected are updated based on the measured values. The characteristic values shown in FIG. 9A are characteristic values before update. FIG. 12 shows measured values. In the present embodiment, the characteristic values of the type of printing medium are brought close to the measured values by a set percentage. Because the measured values contain measurement errors, the characteristic values may be rather changed such that the differences between the measured values and the characteristic values are reduced in a stepwise manner through learning multiple times, that is, the differences reduce by a set percentage, than the characteristic values are directly replaced with the measured values at a time. One example of that is expressed by a generalized formula as follows.

Updated characteristic values $(T_{n+1})$=(Measured values $(R)$−Characteristic values $(T_n)$)×α+Pre-updated characteristic values $(T_n)$ Here, α is a value that indicates a percentage by which characteristic values are brought close to measured values. When the percentage of reduction in difference is set to 25%, the central value of specular reflection value is as follows. For example, when $T_n=T_0$ (initial value), $T_1$ is found through the first update.

When R=103 and $T_n=T_0=99$, $T_1$ is found as follows.

$T_0=(103-99)\times 0.25+99=100$

Similarly, the characteristic values of diffused reflection value and paper thickness are updated. The updated results are shown in FIG. 9B. The fact that the extraction ranges of specular reflection value and diffused reflection value each are ±5 from the central value and the extraction range of paper thickness is ±50 from the central value remains unchanged, and minimum values and maximum values are also updated according to central values. The original characteristic values are overwritten with the updated characteristic values. The updated characteristic values are stored as the characteristic values of standard half-glossy paper in the EEPROM 404, and used in subsequent printing medium determination processes. Thus, the printing medium determination process ends.

In the above-described example, when the characteristic values are updated, the characteristic values are bought close to the measured values by 25%; however, the percentage of reduction in difference is not limited thereto and may be a percentage higher than 0% and lower than or equal to 100%. The percentage of reduction in difference may be set for each type of printing medium or may be set for each characteristic.

In a state where the characteristic values are updated as shown in FIG. 9B, standard half-glossy paper of which the characteristics of a printing medium are (diffused reflection value, specular reflection value, paper thickness)=(103, 98, 225) is measured again. The results of priority assignment in order of closeness of the characteristic values to the measured values are shown in FIG. 14B. As a result of the update of the characteristic values of standard half-glossy paper, standard half-glossy paper is ordered in the first place. Therefore, in step S204, standard half-glossy paper that is the measured printing medium is displayed on the input/output unit 406 as the top printing medium, and a user can more easily select the printing medium.

Information is provided in order of closeness of the characteristic values to the measured values; however, another method may be employed. When the usage history information of printing media used is stored in the EEPROM 404, or the like, the history information may be used. For example, the types of printing media extracted through the printing medium extraction process of FIG. 10 are displayed such that a more recently used printing medium, indicated by the history information, is a printing medium having a higher order of priority and the name of printing medium having a higher order of priority is displayed in order from the top.

Alternatively, as another method of incorporating measured values into characteristic values of a type of printing medium, an average value of last N measured values may be set as each characteristic value. FIG. 15A to FIG. 15D are tables for illustrating a method of setting a characteristic value by using last three measured values. Here, the specular reflection value of standard half-glossy paper will be described as an example. FIG. 15A shows the case where standard half-glossy paper is not selected even once in step S206. In FIG. 15A, 99 that is an initially set value is input as last three values, and the average value is also 99, so the characteristic value is 99. In FIG. 15B, when standard half-glossy paper is selected, the measured value 103 is input as the last measured value. The average value 100.3 at the time when the measured value 103 is input is set as the characteristic value that is used subsequently. FIG. 15C shows the case where standard half-glossy paper is further selected, and 104 is input as the last measured value. The average value at this time, that is, 102, is set as the characteristic value to be used subsequently. FIG. 15D shows the case where standard half-glossy paper is further selected in the state of FIG. 15C, and 102 is input as the last measured value. The average value 103 at this time is set as the characteristic value to be used subsequently.

Estimated Automatic Mode

Figure 16:
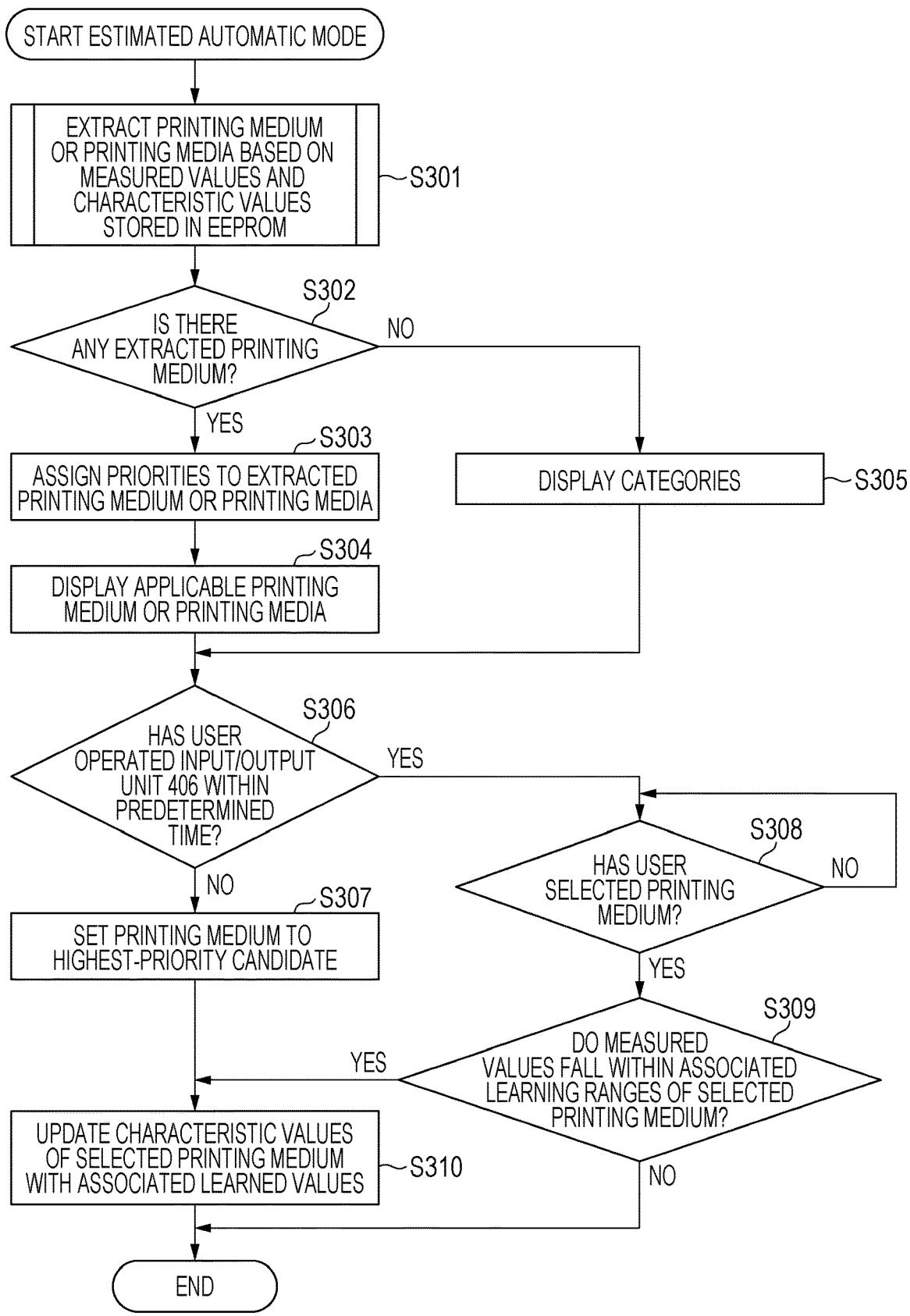
FIG. 16 is a flowchart showing an estimated automatic mode in the embodiment.

FIG. 16 is a flowchart showing the estimated automatic mode of step S104.

Similar processes are executed in step S301 to step S303, and step S305 to those of step S201 to step S205 of the estimated manual mode shown in FIG. 8.

Figure 7F:
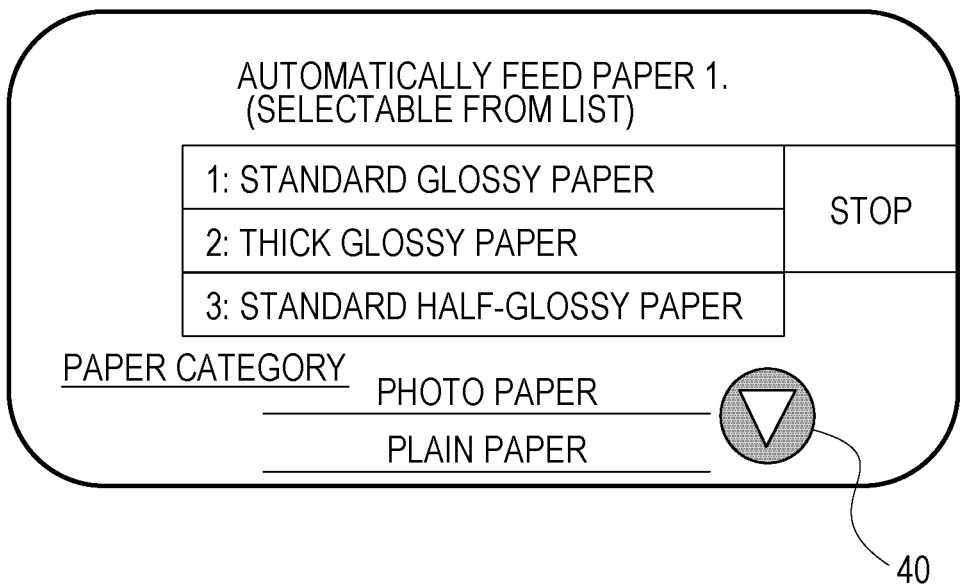

In step S304, as shown in FIG. 7F, the names of the types of printing media are displayed from the top in descending order of priority determined in step S303. Together with candidates for a type of printing medium, "AUTOMATICALLY FEED PAPER 1." is displayed in order to inform that no operation is not required when a type of printing medium of which the order of priority is the highest is selected. In addition, "SELECTABLE FROM LIST" is displayed in order to inform that a type of printing medium other than the type of printing medium of which the order of priority is the highest is selectable.

When the user has not operated the input/output unit 406 within a predetermined time in step S306, the type of printing medium of which the priority is the highest of the types of printing media shown in step S304 is determined as the type of the printing medium 105 to be printed. The process proceeds to step S310.

When the user has operated the input/output unit 406 within the predetermined time in step S306, a type of printing medium, selected by the user, is determined as the type of the printing medium 105 to be printed in step S308. When a type of printing medium is selected in step S308, it is determined in step S309 whether the measured values fall within the learning ranges of the selected printing medium. Similar processes are executed in step S309 and step S310 to those of step S207 and step S208 in FIG. 8. When the measured values do not fall within the learning ranges, the printing medium determination process in the estimated automatic mode is ended without updating the characteristic values. When the measured values fall within the learning ranges, the process proceeds to step S310.

In step S310, the characteristic values of the selected type of printing medium are updated with changed values based on the measured values, and the changed values are stored in the EEPROM 404. Thus, the printing medium determination process in the estimated automatic mode ends.

Manual Mode

Figure 17:
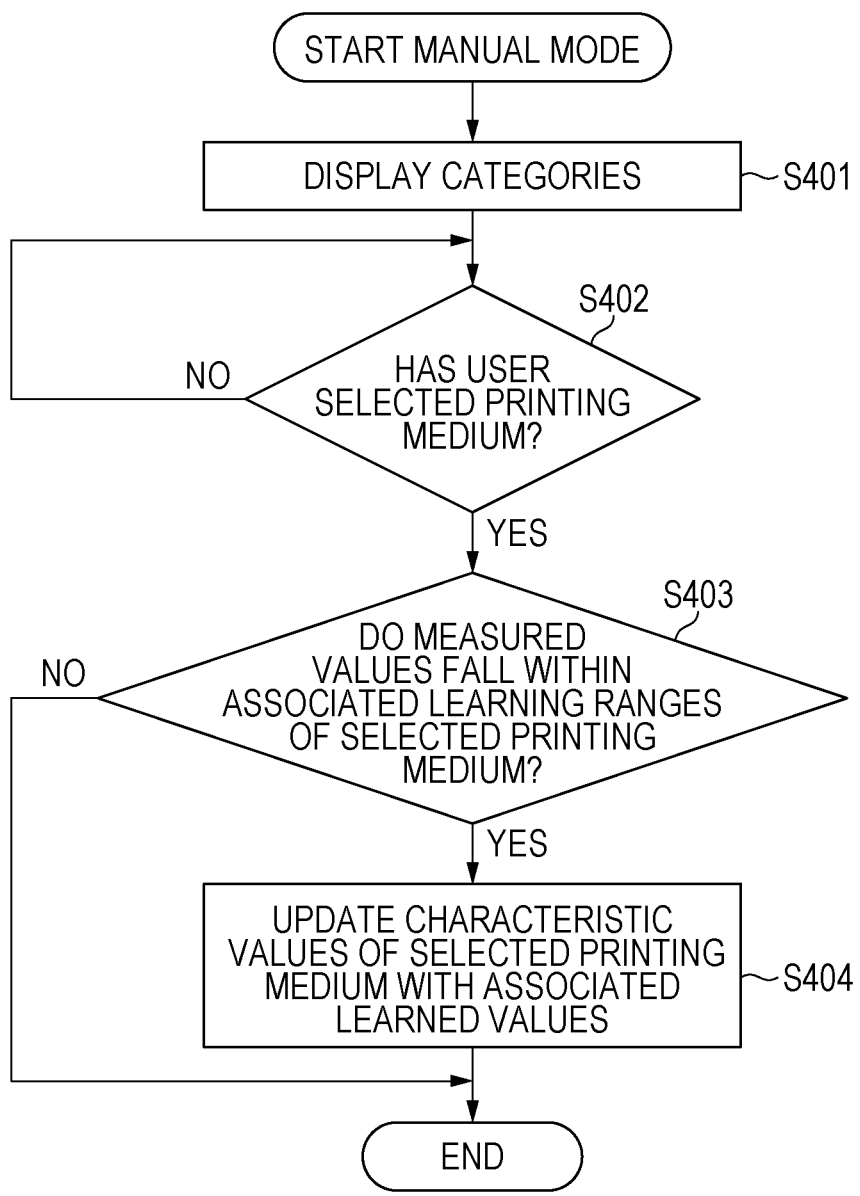
FIG. 17 is a flowchart showing a manual mode in the embodiment.

FIG. 17 is a flowchart showing the manual mode of step S105.

In step S401, categories of printing media as shown in FIG. 7B are displayed on the input/output unit 406. In the present embodiment, the categories are displayed in a predetermined order. Alternatively, when the usage history information of printing media used is stored in the EEPROM 404, or the like, categories to which recently used printing media indicated by the history information belong may be displayed at higher levels. Alternatively, recently used types of printing media, indicated by the history information, may be displayed at higher levels, and categories may be displayed below those types of printing media. Alternatively, not categories but all the types of printing media may be displayed.

When the user selects a category, types of printing media that belong to the category selected by the user as shown in FIG. 7C are displayed. When the user selects a printing medium from among the displayed types of printing media (step S402), it is determined in step S403 whether the measured values fall within the learning ranges of the selected printing medium. Similar processes are executed in step S403 and step S404 to those of step S207 and step S208 in FIG. 8. When the measured values do not fall within the learning ranges, the printing medium determination process in the manual mode is ended without updating the characteristic values. When the measured values fall within the learning ranges, the characteristic values of the type of printing medium, selected in step S402, are updated with values changed based on the measured values in step S404, and the changed values are stored in the EEPROM 404. Thus, the printing medium determination process in the manual mode ends.

Fixed Mode

When the fixed mode is used, the user selects the fixed mode and sets in advance a type of printing medium to be fixedly used before the printing medium determination process is started. The set type of printing medium is stored in the EEPROM 404. Here, description will be made on the assumption that standard glossy paper is set in advance.

Figure 18:
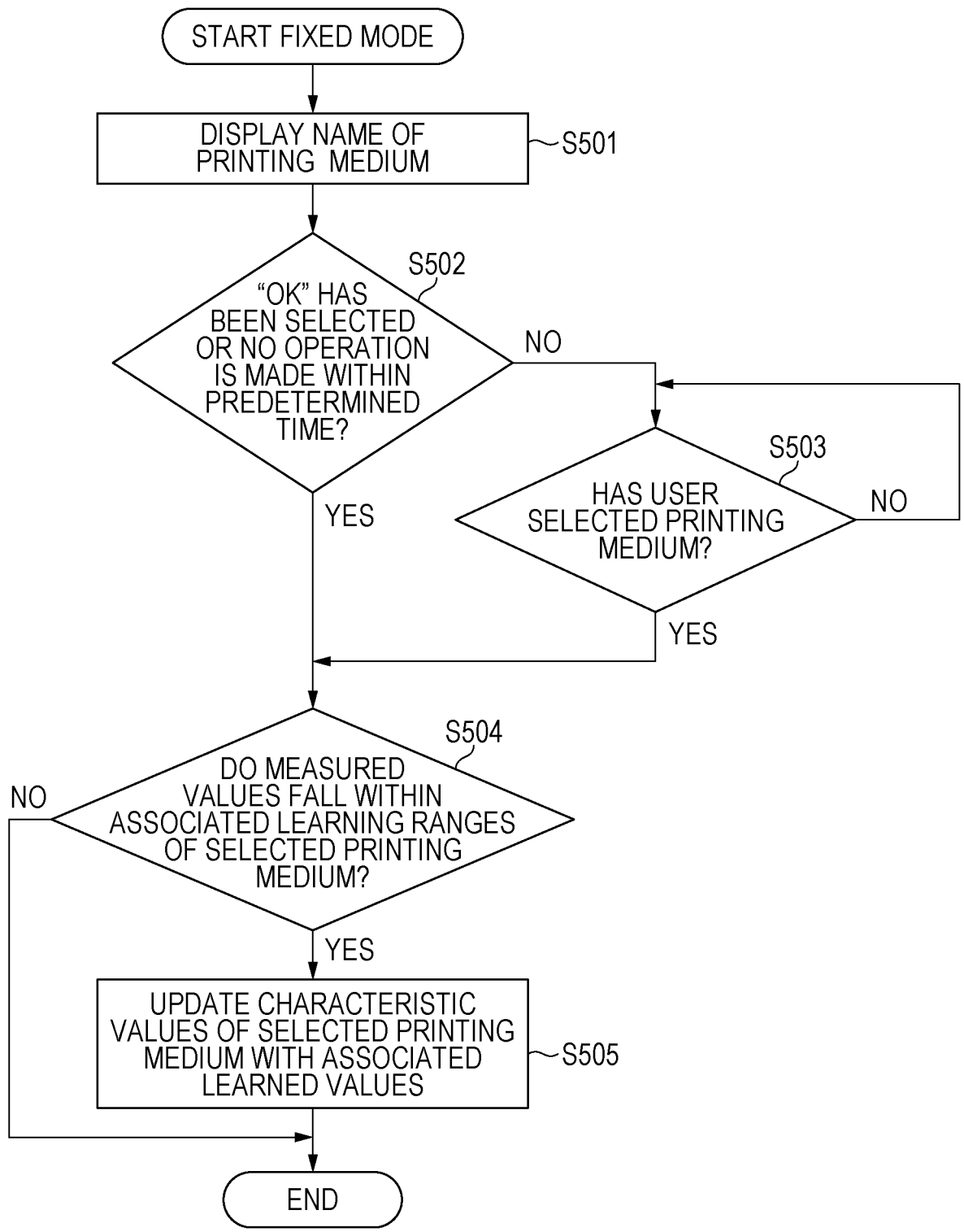
FIG. 18 is a flowchart showing a fixed mode in the embodiment.

FIG. 18 is a flowchart showing the fixed mode of step S106.

Figure 7G:
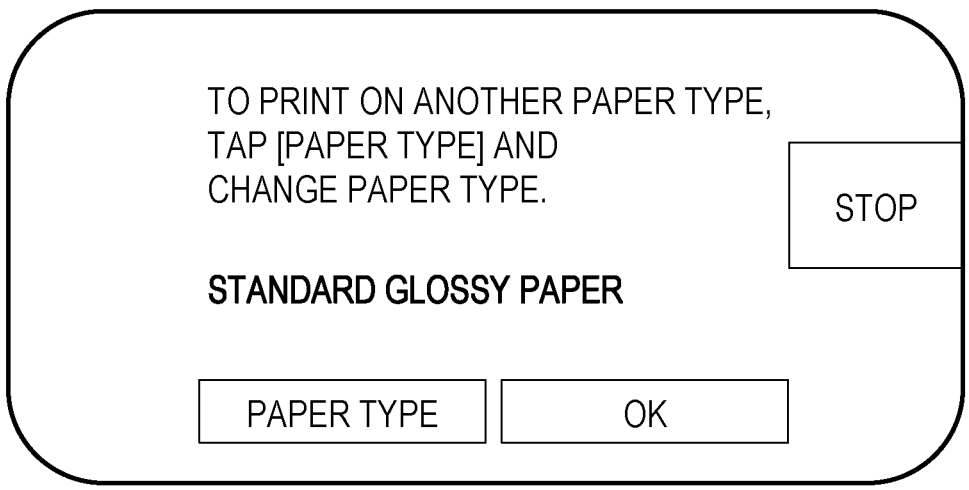

In step S501, the name of the type of printing medium set in advance is displayed on the input/output unit 406 as shown in FIG. 7G.

When the user has not operated the input/output unit 406 within a predetermined time or selects "OK" in FIG. 7G in step S502, standard glossy paper set in advance is determined as the printing medium 105 to be printed, and the process proceeds to step S504.

When "PAPER TYPE" is selected within the predetermined time in step S502, the categories of printing media are displayed as shown in FIG. 7B, and the user is able to select a type of printing medium not set in advance. When a type of printing medium is selected in step 503, the process proceeds to step S504.

Similar processes are executed in step S504 and step S505 to those of step S207 and step S208 in FIG. 8. In step S504, it is determined whether the measured values fall within the learning ranges of the selected printing medium. When the measured values do not fall within the learning ranges, the printing medium determination process in the fixed mode is ended without updating the characteristic values. When the measured values fall within the learning ranges, the characteristic values of the selected type of printing medium are updated with values changed based on the measured values in step S505, and the changed values are stored in the EEPROM 404. Thus, the printing medium determination process in the fixed mode ends.

Bar Code Mode

Figure 20A:
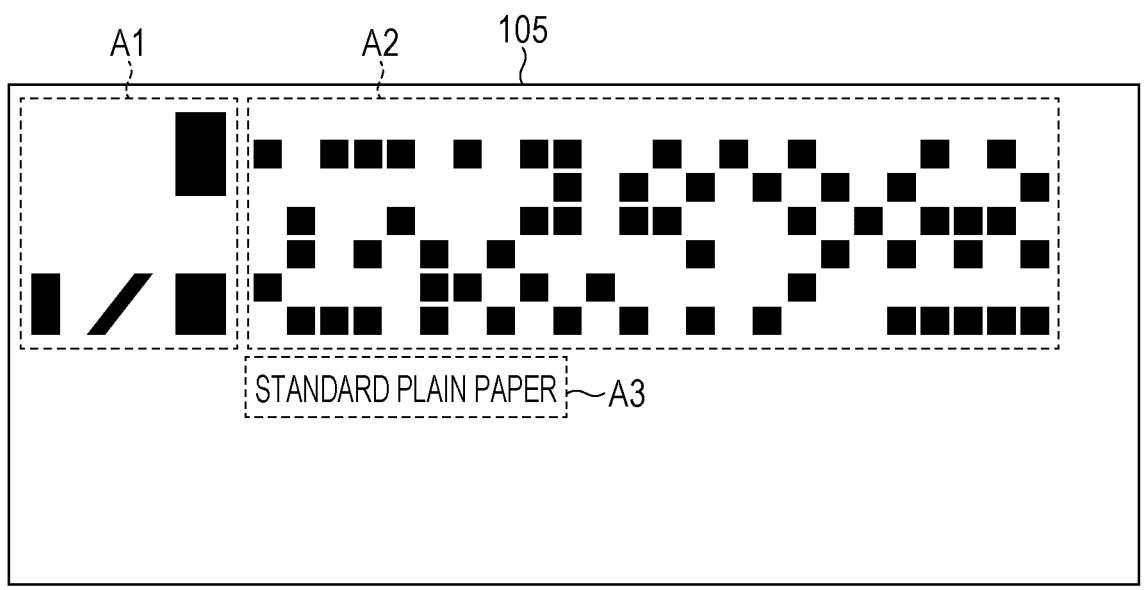
FIG. 20A and FIG. 20B are views showing a bar code to be printed on a printing medium in the embodiment.
Figure 20B:
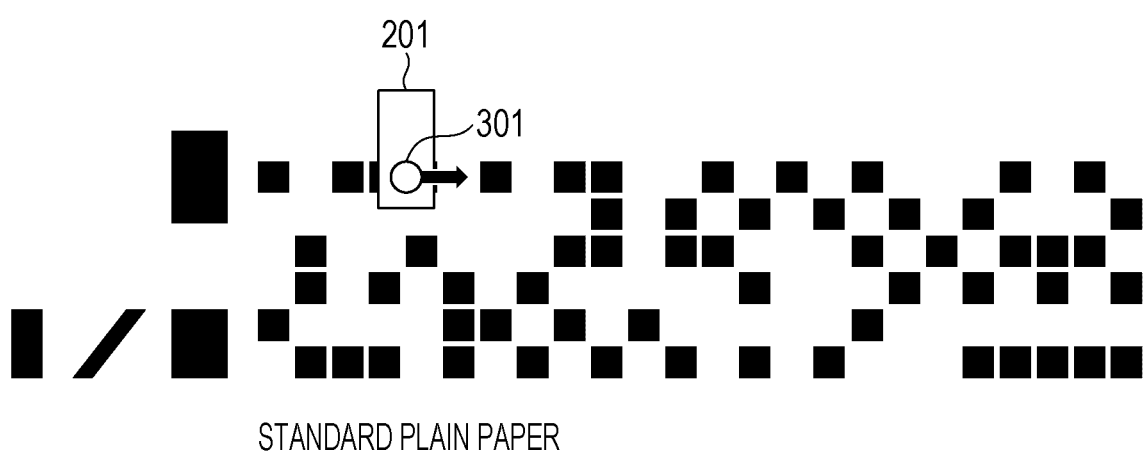

The bar code mode is mainly used for rolled paper. Hereinafter, description will be made on the assumption that a printing medium to be printed is rolled paper. The printing medium is set in the printing apparatus 100 and used when subjected to printing. When the printing medium is removed from the printing apparatus 100 or usage of the printing medium is stopped and a different printing medium is used while the bar code mode is designated by the user, a bar code as shown in FIG. 20A is printed on the printing medium. The type of the printing medium shown in FIG. 20A and FIG. 20B is standard plain paper. The bar code is divided into an area A1, an area A2, and an area A3. In the area A1, a pattern for adjusting a reading position is printed. In the area A2, information about the type of printing medium is printed as a bar code. In the area A3, the name of the type of printing medium is printed. Not a bar code but any mode in which a type of printing medium can be identified from information printed on the printing medium may be employed. For example, a QR code (registered trademark), or the like, may be employed.

Figure 19:
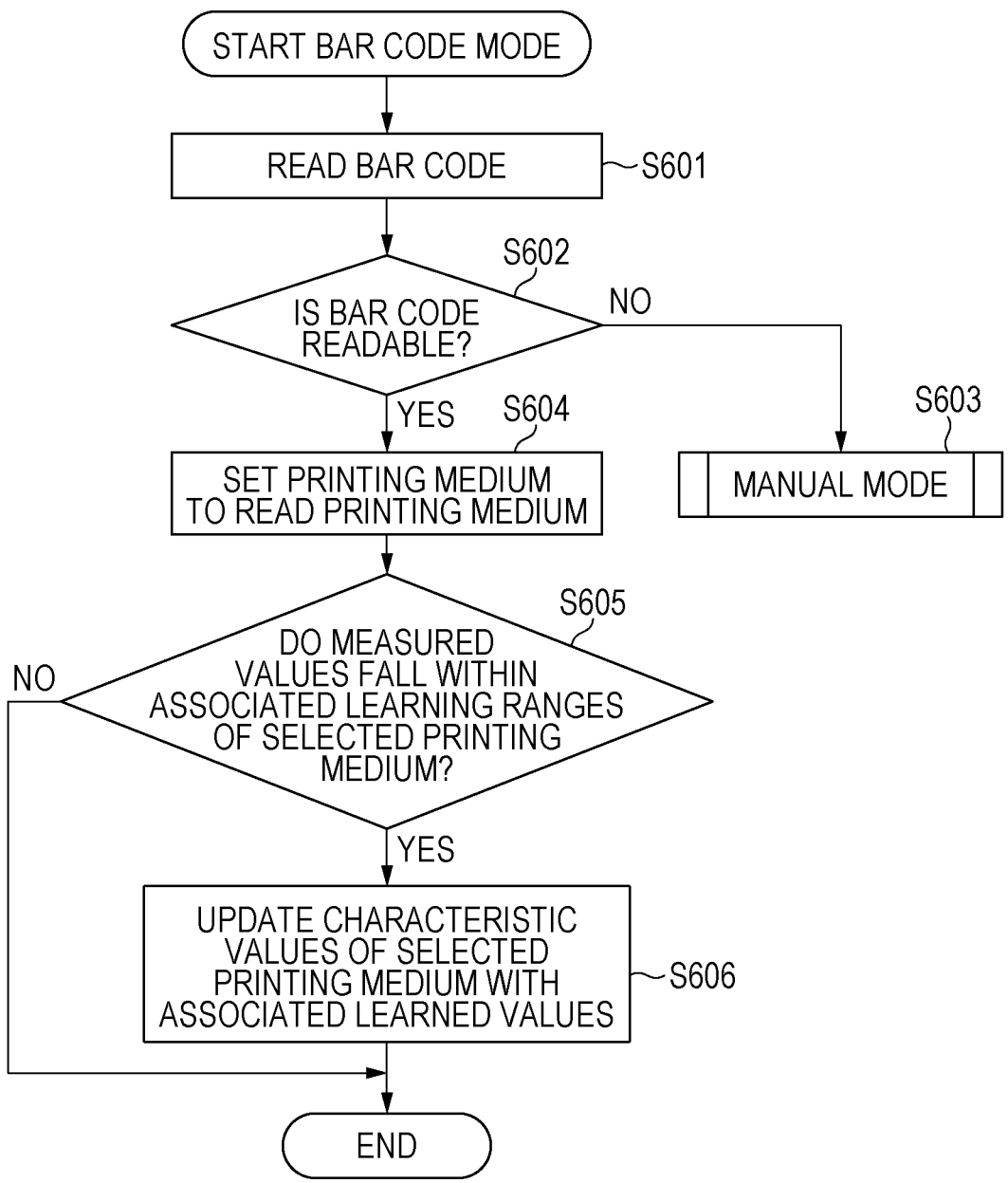
FIG. 19 is a flowchart showing a bar code mode in the embodiment.

FIG. 19 is a flowchart showing the bar code mode of step S107.

In step S601, the bar code printed on the printing medium 105 to be printed as shown in FIG. 20A is read with the optical sensor 201. FIG. 20B is a schematic view showing a state of being read. While the carriage 101 is moving, the first LED of the optical sensor 201 is irradiated to the printing medium, and a diffused reflection component is detected with the first photodiode 304. Thus, the bar code is read, and a result of having read bar code is input in CPU 401.

In step S602, it is determined whether the bar code is readable. When the bar code is readable, the printing medium 105 to be printed is determined to the read type of printing medium in step S604. When the bar code is not readable, the manual mode of FIG. 17 is executed in step S603.

When the type of printing medium is determined in step S604, similar processes are executed in step S605 and step S606 to those of step S207 and step S208 in FIG. 8. In step S605, it is determined whether the measured values fall within the learning ranges of the selected printing medium. When the measured values do not fall within the learning ranges, the printing medium determination process in the bar code mode is ended without updating the characteristic values. When the measured values fall within the learning ranges, the characteristic values of the selected type of printing medium are updated with values changed based on the measured values in step S606, and the changed values are stored in the EEPROM 404. Thus, the printing medium determination process in the bar code mode ends.

As described above, even in a mode in which a type of printing medium to be printed is determined without using measurement results, the characteristics of a printing medium are measured, and the characteristic values of the type of printing medium, determined based on the measured values, are learned. Therefore, as compared to the case where learning is performed in modes in which only measurement results are used, characteristic values that make it possible to further accurately identify a type of printing medium are more likely to be obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to embodiments of the present invention, there is a higher possibility that a type of printing medium can be accurately identified.

While the present invention has been described with reference to exemplary embodiments, it is to be understood that the invention is not limited to the disclosed exemplary embodiments.

This application claims the benefit of Japanese Patent Application No. 2019-063891, filed Mar. 28, 2019, which is hereby incorporated by reference herein in its entirety.

What is claimed is:

1. An information processing apparatus comprising:
one or more processors; and
one or more memories storing instructions that, when executed by the one or more processors, cause the information processing apparatus to:
acquire a measurement result obtained by measuring a characteristic value of a printing medium to be printed;
acquire a reference characteristic value set in advance for each of types of printing medium to identify a type of the printing medium;
input information indicating a type of the printing medium to be printed; and
based on the measurement result acquired change the reference characteristic value set in advance for the type of printing medium indicated by the information input, control an operation to determine a type of the printing medium to be printed, wherein
the type of printing medium indicated by the information input is determined as the type of the printing medium to be printed,
when executed by the one or more processors, the instructions further cause the information processing apparatus to be capable of executing a measurement mode and a designation mode, wherein
in the measurement mode, the type of the printing medium to be printed is determined by using the measurement result acquired and the reference characteristic values set in advance, and
in the designation mode, the type of the printing medium to be printed is determined without using the measurement result acquired, and
even in the designation mode, the measurement result is acquired and the reference characteristic value set in advance is changed for the type of printing medium indicated by the information input based on the measurement result acquired.

2. The information processing apparatus according to claim 1, wherein, in the measurement mode, the measurement result is acquired and the reference characteristic value set in advance is changed for the type of printing medium determined as the printing medium to be printed and input.

3. The information processing apparatus according to claim 1, wherein
information indicating a type of printing medium is provided, and
in the designation mode, information indicating a type of printing medium without using the measurement result is provided.

4. The information processing apparatus according to claim 2, wherein
information indicating a type of printing medium is provided, and
in the measurement mode, extract a candidate for the type of the printing medium of which the characteristic value is measured, based on the measurement result and the reference characteristic values set in advance and the candidate is provided.

5. The information processing apparatus according to claim 4, wherein, in the measurement mode, the measurement result is acquired, a plurality of types of printing medium based on the measurement result is provided and the reference characteristic values set in advance, determine a top one of the plurality of types of printing medium as the type of the printing medium to be printed when no operation is performed within a predetermined time and information associated with the top one of the plurality of types of printing medium is input, and the reference characteristic value set in advance is changed for the type of printing medium.

6. The information processing apparatus according to claim 4, wherein
the reference characteristic value set in advance is a value including a maximum value and a minimum value, and
in the measurement mode, information indicating the type of printing medium for which the reference characteristic value set is provided in advance has a central value, the measurement result falls within a first range from the central value.

7. The information processing apparatus according to claim 4, wherein, in the measurement mode, information indicating a type of printing medium in a predetermined order is provided.

8. The information processing apparatus according to claim 4, wherein, in the measurement mode, preferentially provide information indicating a type of printing medium of which timing used is closer, based on usage history information indicating the type of printing medium that has been determined to be printed.

9. The information processing apparatus according to claim 1, wherein, in the designation mode, set in advance the type of the printing medium to be printed before the characteristic value of the printing medium to be printed is measured, a measurement result of the characteristic value of the printing medium to be printed is acquired, information associated with the type of printing medium set in advance is input, and the reference characteristic value set in advance is changed for the type of printing medium input.

10. The information processing apparatus according to claim 1, wherein, in the designation mode, acquire a type of printing medium by reading information for identifying the type of printing medium, the information is caused by a user to be printed on the printing medium as information designating the type of printing medium, input information associated with the acquired type of printing medium, and the reference characteristic value set in advance is changed for the type of printing medium input.

11. The information processing apparatus according to claim 1, wherein the one or more processors futher cause the information processing apparatus to receive input of a mode selected from among a plurality of modes, including the measurement mode and the designation mode, for determining the type of the printing medium to be printed.

12. The information processing apparatus according to claim 1, wherein the reference characteristic value is changed such that the reference characteristic value set in advance for the type of printing medium determined to be printed approaches the measurement result.

13. The information processing apparatus according to claim 12, wherein
the reference characteristic value set in advance is a value including a maximum value and a minimum value, and
the reference characteristic value is changed such that a central value of the reference characteristic value set in advance for the type of printing medium determined to be printed approaches the measurement result.

14. The information processing apparatus according to claim 12, wherein, for a predetermined type of printing medium, set an average of the measurement result when information associated with the predetermined type of printing medium for the reference characteristic value set in advance for the predetermined type of printing medium is input.

15. An information processing apparatus comprising:
one or more processors; and
one or more memories storing instructions that, when executed by the one or more processors, cause the information processing apparatus to:
acquire a measurement result obtained by measuring a characteristic value of a printing medium to be printed;
acquire a reference characteristic value set in advance for each of types of printing medium to identify a type of the printing medium;
input information indicating a type of the printing medium to be printed;
based on the measurement result acquired, change the reference characteristic value set in advance for the type of printing medium indicated by the information input; and control an operation to determine a type of the printing medium to be printed, wherein the type of printing medium indicated by the information input is determined as the type of the printing medium to be printed, and when executed by the one or more processors, the instructions further cause the information processing apparatus to be capable of executing a measurement mode and an identification mode, wherein in the measurement mode, the type of the printing medium to be printed is determined by using the measurement result acquired and the reference characteristic values set in advance and acquired, in the identification mode, the type of the printing medium to be printed is determined without using the measurement result acquired by reading information printed on the printing medium for identifying the type of printing medium to acquire the type of printing medium and information associated with the acquired type of printing medium is input, and even in the identification mode, acquire the measurement result and the reference characteristic value set in advance is changed for the type of printing medium, indicated by the information input, based on the measurement result acquired.

16. The information processing apparatus according to claim 15, wherein, in the measurement mode, acquire the measurement result and cause the reference characteristic value set in advance is changed for the type of printing medium determined as the printing medium to be printed and input.

17. The information processing apparatus according to claim 15, wherein information indicating a type of printing medium is provided, and in the designation mode, cause the information indicating a type of printing medium without using the measurement result is provided.

18. The information processing apparatus according to claim 15, wherein information indicating a type of printing medium is provided, and in the measurement mode, extract a candidate for the type of the printing medium of which the characteristic value is measured, based on the measurement result and the reference characteristic values set in advance and the candidate is provided.

19. The information processing apparatus according to claim 18, wherein, in the measurement mode, acquire the measurement result, provide a plurality of types of printing medium based on the measurement result and the reference characteristic values set in advance, determine a top one of the plurality of types of printing medium as the type of the printing medium to be printed when no operation is performed within a predetermined time and input information associated with the top one of the plurality of types of printing medium, and change the reference characteristic value set in advance for the type of printing medium input.

20. The information processing apparatus according to claim 1, further comprising:

a printing head arranged to apply a printing material to a printing medium; and a conveyor arranged to convey a printing medium to a position where printing is performed, wherein when the conveyor conveys the printing medium to a position where the printing head is able to perform printing, the printing head is arranged to perform printing on the printing medium.

21. The information processing apparatus according to claim 20, further comprising:

a carriage loaded with the printing head and arranged to be movable, and an optical sensor is mounted on the carriage and is arranged to measure a characteristic value of the printing medium conveyed by the conveyor to a position where the optical sensor is able to perform a measurement.

22. An information processing method comprising:

when a measurement process is executed, measuring a characteristic value of a printing medium to be printed;

acquiring a reference characteristic value set in advance for each of types of printing medium to identify a type of the printing medium;

inputting information indicating a type of the printing medium determined to be printed; and changing the reference characteristic value set in advance for the input type of printing medium, based on the measured characteristic value; and when a designation process is executed, measuring a characteristic value of a printing medium to be printed;

acquiring a reference characteristic value set in advance for each of types of printing medium to identify a type of the printing medium;

inputting information associated with the type of the printing medium to be printed without using the measured characteristic value; and changing the reference characteristic value set in advance for the input type of printing medium based on the measured characteristic value.

23. An information processing method comprising:

when a measurement process is executed, measuring a characteristic value of a printing medium to be printed;

acquiring a reference characteristic value set in advance for each of types of printing medium to identify a type of the printing medium;

inputting information indicating a type of the printing medium determined to be printed; and changing the reference characteristic value set in advance for the input type of printing medium based on the measured characteristic value; and when a designation process is executed, measuring a characteristic value of a printing medium to be printed;

acquiring a reference characteristic value set in advance for each of types of printing medium to identify a type of the printing medium;

determining the type of the printing medium to be printed regardless of the measured characteristic value;

inputting information indicating a type of the printing medium determined to be printed; and changing the reference characteristic value set in advance for the input type of printing medium based on the measured characteristic value.

24. The information processing method according to claim 22, further comprising:

when the measurement process is executed, measuring a characteristic value of a printing medium to be printed;

acquiring a reference characteristic value set in advance for each of types of printing medium to identify a type of the printing medium;

extracting a candidate for the type of the printing medium on which a measurement is performed, based on the measured characteristic value, and the reference characteristic values set in advance;

providing information indicating the extracted candidate for the type of the printing medium and inputting information indicating a type of the printing medium determined to be printed; and changing the reference characteristic value set in advance for the input type of printing medium based on the measured characteristic value and the reference characteristic value set in advance for the input type of printing medium.

25. A non-transitory computer-readable storage medium storing a program for causing a computer to execute a process, the process comprising:

when a measurement process is executed,
  measuring a characteristic value of a printing medium to be printed;
  acquiring a reference characteristic value set in advance for each of types of printing medium to identify a type of the printing medium;
  inputting information associated with the type of the printing medium determined to be printed; and
  changing the reference characteristic value set in advance for the input type of the printing medium based on the measured characteristic value; and when a designation process is executed,
  measuring a characteristic value of a printing medium to be printed;
  acquiring a reference characteristic value set in advance for each of types of printing medium to identify a type of the printing medium;
  inputting information indicating a type of the printing medium to be printed without using the measured characteristic value; and
  changing the reference characteristic value set in advance for the input type of printing medium based on the measured characteristic value.

26. A non-transitory computer-readable storage medium storing a program for causing a computer to execute a process, the process comprising:

when a measurement process is executed,
  measuring a characteristic value of a printing medium to be printed;
  acquiring a reference characteristic value set in advance for each of types of printing medium to identify a type of the printing medium;
  inputting information indicating a type of the printing medium determined to be printed; and
  changing the reference characteristic value set in advance for the input type of printing medium based on the measured characteristic value; and when a designation process is executed,
  measuring a characteristic value of a printing medium to be printed;
  acquiring a reference characteristic value set in advance for each of types of printing medium to identify a type of the printing medium;
  determining the type of the printing medium to be printed regardless of the measured characteristic value;
  inputting information indicating a type of the printing medium determined to be printed; and
  changing the reference characteristic value set in advance for the input type of printing medium based on the measured characteristic value.

* * * * *